United States Patent [19]
Larsen et al.

[11] Patent Number: 5,832,240
[45] Date of Patent: Nov. 3, 1998

[54] ISDN-BASED HIGH SPEED COMMUNICATION SYSTEM

[76] Inventors: Allen J Larsen; Jennifer K. Hergert, both of 1200 Nadine Dr., Campbell, Calif. 95008; Charles D. Brown, 3206 Wildmere Pl., Herndon, Va. 22021; William C. Cross, 18549 Blythswood Dr., Los Gatos, Calif. 95030; Ronald E. Dove, 1811 Pool Dr., Felton, Calif. 95018; Paul W. T. Heller, 3765 Cefalu Dr., San Jose, Calif. 95124

[21] Appl. No.: 843,114

[22] Filed: Apr. 28, 1997

Related U.S. Application Data

[63] Continuation of Ser. No. 585,607, Jan. 11, 1996, abandoned, which is a continuation of Ser. No. 225,877, Apr. 11, 1994, abandoned, which is a division of Ser. No. 883,862, May 15, 1992, abandoned.

[51] Int. Cl.$^6$ .................................................... G06F 13/00
[52] U.S. Cl. ........................................................... 395/285
[58] Field of Search .................................... 395/280, 285, 395/286; 370/94.1, 110.1; 379/211

[56] References Cited

U.S. PATENT DOCUMENTS

| | | | |
|---|---|---|---|
| 4,433,378 | 2/1984 | Leger | 395/325 |
| 4,441,162 | 4/1984 | Lillie | 395/425 |
| 4,858,112 | 8/1989 | Puerzer et al. | 395/325 |
| 4,884,269 | 11/1989 | Duncanson et al. | 370/110.1 |
| 4,905,237 | 2/1990 | Voelzke | 370/110.1 |
| 4,961,185 | 10/1990 | Sawada | 370/79 |
| 4,998,240 | 3/1991 | Williams | 370/17 |
| 5,012,470 | 4/1991 | Shobu et al. | 370/110.1 |
| 5,047,927 | 9/1991 | Sowell et al. | 395/425 |
| 5,121,390 | 6/1992 | Farrell et al. | 370/94.1 |
| 5,208,846 | 5/1993 | Hammond et al. | 379/15 |
| 5,329,579 | 7/1994 | Brunson | 379/88 |
| 5,450,412 | 9/1995 | Takebayashi et al. | 370/95.1 |
| 5,479,498 | 12/1995 | Brandman et al. | 379/283 |

*Primary Examiner*—Ayaz R. Sheikh
*Assistant Examiner*—David A. Wiley
*Attorney, Agent, or Firm*—James R. Burdett

[57] ABSTRACT

An ISDN interface is provided on a card, which is adapted for mounting in a terminal computer and which is operable to exchange data with a terminal computer and an ISDN. The ISDN interface card includes a protocol processor that is programmable to process data encoded in accordance with a number of different protocols and a digital signal processor that is programmable for data compression, encryption and facsimile applications, and u-law and a-law conversion, among other applications. The ISDN card dynamically allocates data calls between one or two B-channels to achieve a data transmission rate of 128 kbps. A power supply with a ring generator is provided to allow for the use of an analog telephone with the ISDN card. The ISDN card is programmable to allow users to create customized screens for various call processes, and to allow for the updating of a flash ROM coupled to the protocol processor through the terminal computer and the ISDN.

22 Claims, 18 Drawing Sheets

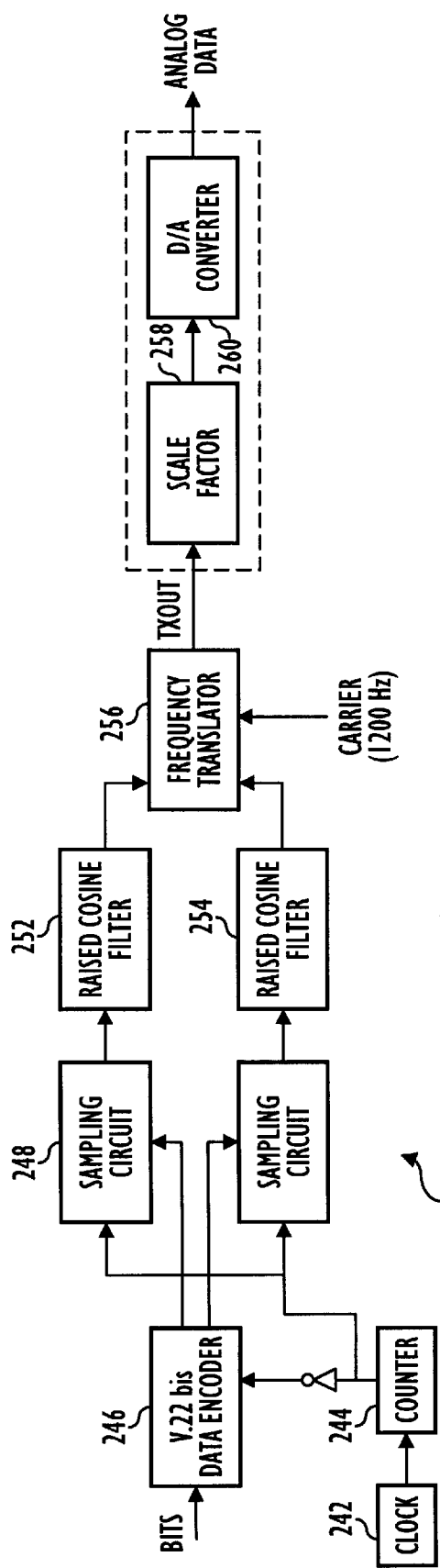
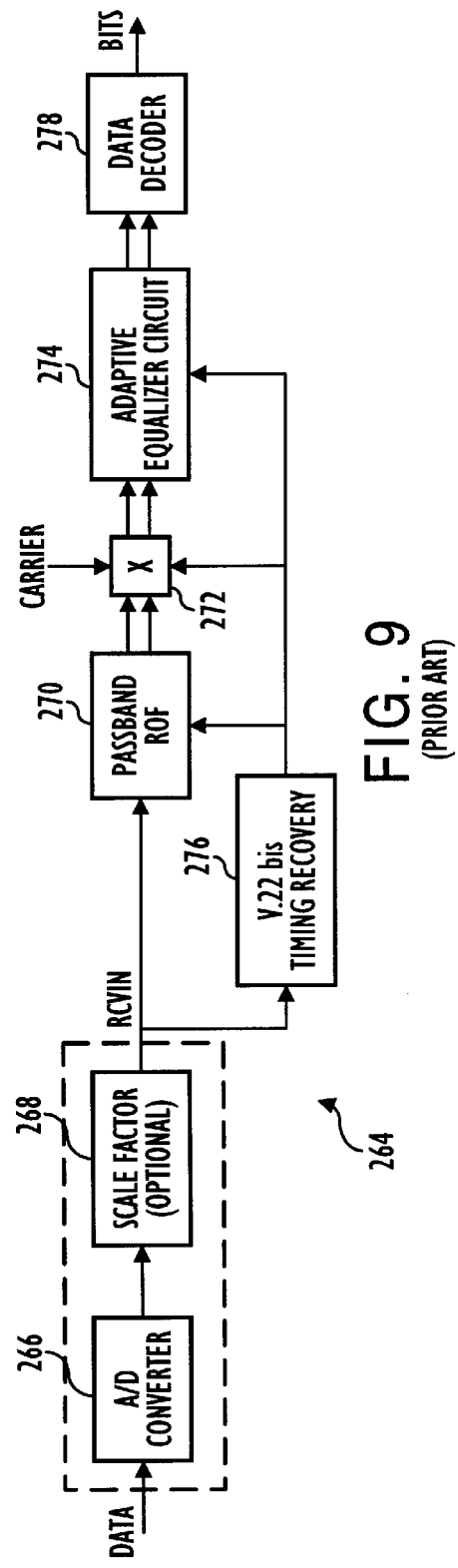

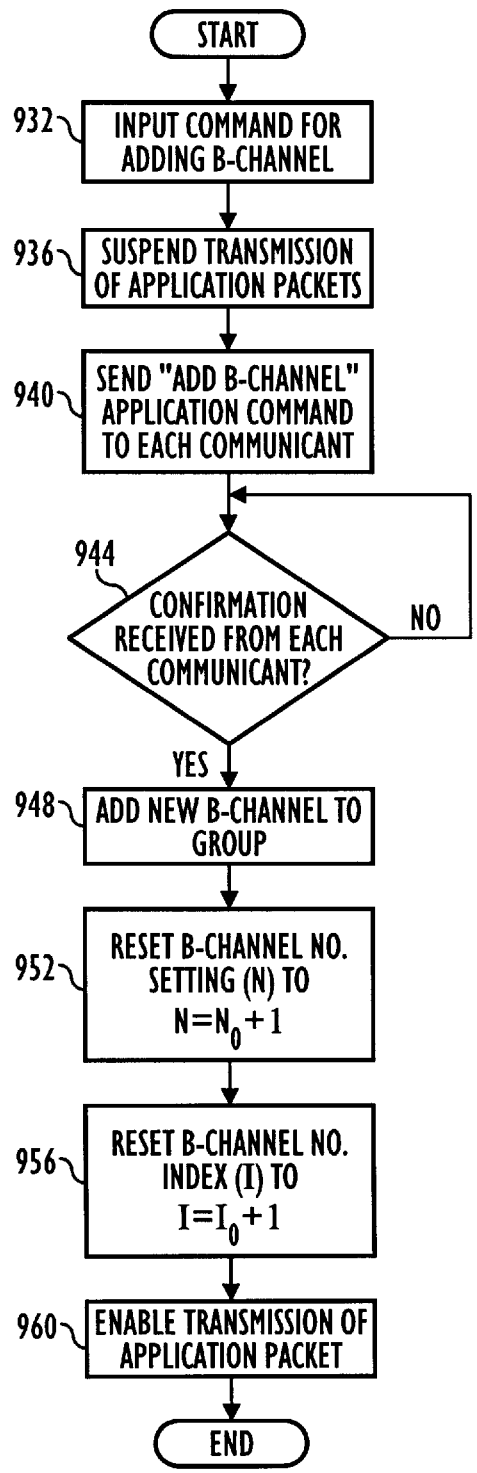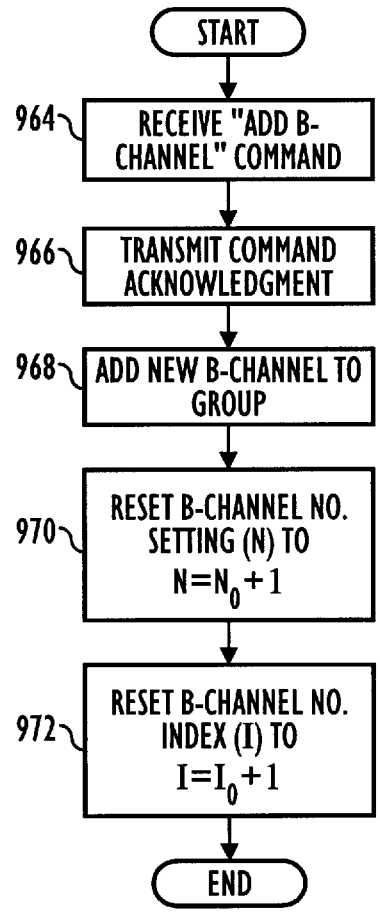
FIG. 16A
FIG. 16B

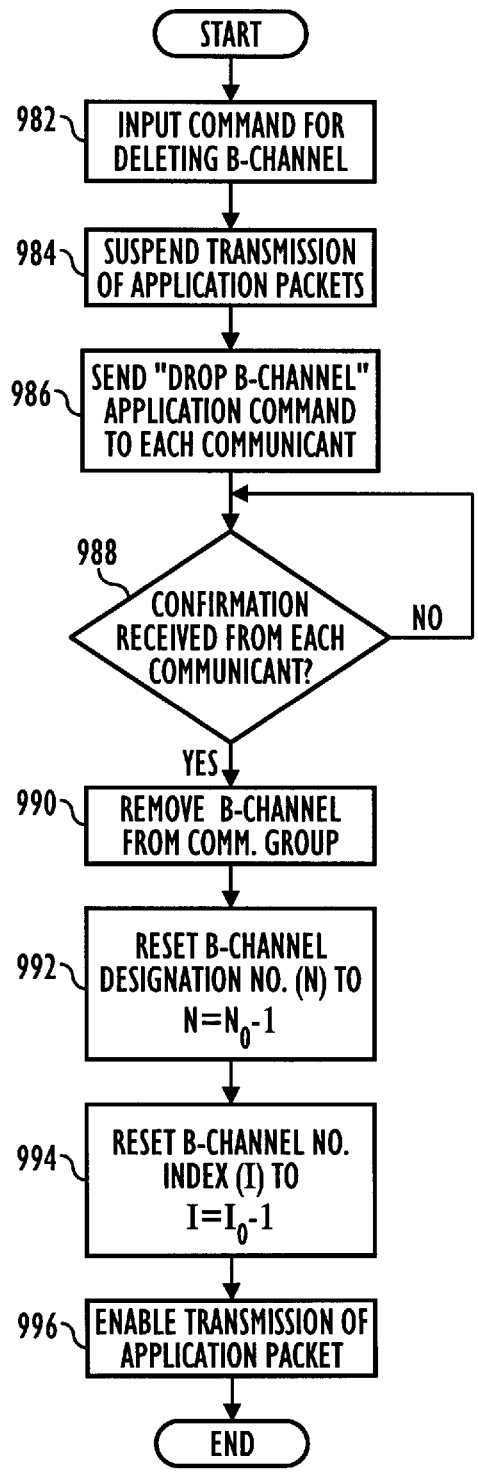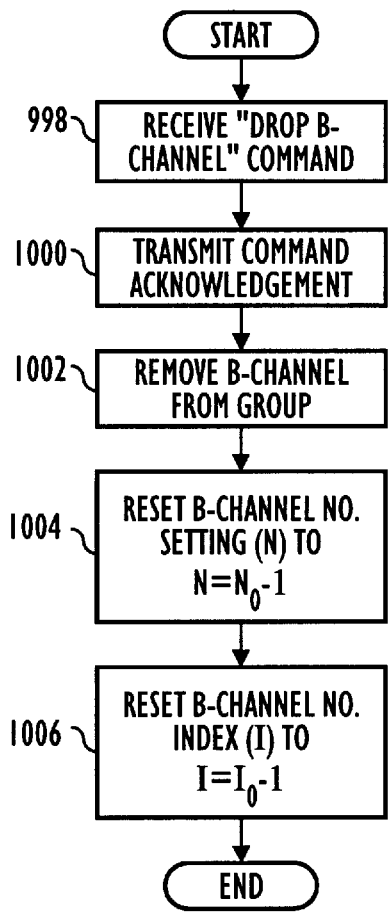
FIG. 17A
FIG. 17B

ISDN-BASED HIGH SPEED COMMUNICATION SYSTEM This application is a continuation of application Ser. No. 08/585,607, filed Jan. 11, 1996, now abandoned which is a continuation of application Ser. No. 08/225,877, filed Apr. 11, 1994, now abandoned which is, in turn, a divisional of Ser. No. 08/883,862, filed May 15, 1992 now abandoned.

BACKGROUND OF THE INVENTION

The present invention relates generally to a high-speed communication system, and is particularly concerned with a high-speed communication system that can be used in conjunction with an existing integrated digital services network (ISDN).

An ISDN is a network for transporting digital voice, data and video services. The architecture of an ISDN is configured to provide end-to-end connectivity between various kinds of terminal equipment, to provide users with greater control over their telecommunications services than has been provided to date by private branch exchanges and stored program control central offices, and to provide a universal network interface for voice and data. The ISDN overcomes the shortcomings of public and private telephone networks such as incompatibility between interface and terminating equipment, and the inability, of many networks to handle voice and data information interchangeably. For example, most analog voice networks are slow and inefficient at handling data, while low speed data networks are ineffective for voice transmission. Although voice networks are slower than data networks, voice networks provide a constant throughput rate that is required to prevent gaps in a received audio signal.

Public and private telephone networks were designed primarily for voice communications at a time when there was neither the technology nor motivation to develop a digital network. Although ISDN provides several advantages over analog networks, the magnitude of investment in analog telecommunications facilities is such that the change from analog to ISDN communications technology has been gradual.

Separate data networks have been implemented to carry data traffic which cannot be economically carried on existing telephone networks. For example, larger businesses and organizations such as government agencies, campuses and businesses in metropolitan areas have purchased data networks such as local area networks (LANs), which handle their data traffic much more efficiently than telephone lines. These systems, however, are expensive and generally not practical or affordable for smaller businesses and individual users. Further, the LANs are generally implemented for use in a local business or campus environment and not for extensive networking with a plurality of remote data networks.

The need therefore arises for an ISDN-based system which provides, in a digital ISDN environment, many of the voice communications services traditionally provided by analog telephone networks. Further, an ISDN-based system is needed which allows users to adapt their personal computers to interface with ISDN networks in an affordable manner in order to benefit from the high speed transmission and networking capabilities associated with ISDN communications. Users can therefore use their personal computers to communicate with other computers in larger networks over ISDN-capable telephone networks that are less expensive and more flexible in terms of services provided than local, specialized networks such as privately owned LANs.

The high data transmission speeds associated with ISDNs can be attributed to their basic configuration. An ISDN, which serves as a basic rate interface (BRI), is characterized by basic service elements comprising two 64 kilobits per second bearer or "B" channels and a 16 kilobit per second signaling or "D" channel. Typically, only one of the B channels is used to send voice through the ISDN to another terminal. When sending data, both B channels can be used; however, two independent calls are set up on the two channels resulting in a data rate of 64 kps.

Methods for achieving higher transmission speeds of 128 kilobits per second, for example, have been proposed by compressing data on a single B channel. Compression, however, is disadvantageous because it introduces errors which would otherwise not occur in the B channels, and because it adds to the complexity and cost of the system due to the requirement for decompression at the receiving end. In addition, the data may already be compressed; therefore no improvement on speed is realized.

SUMMARY OF THE INVENTION

The present invention relates to an interface for a personal computer (PC) and an ISDN which overcomes several shortcomings and realizes several advantages over existing PC-based ISDN interfaces. The interface is preferably in the form of a PC card which can be inserted into an auxiliary slot in a PC and which provides a number of services such as CCITT Group 4 facsimile capability and the support of both voice and data access to the ISDN network. The PC card is programmable to achieve a data transmission rate of 128 kilobits per second by allocating the B channels. The calls can be dynamically allocated; that is, a 128 kilobit single data call allocated to two channels can be interrupted by a voice call. The voice call is put on one of the channels, and the data call reduced to 64 kilobits on the other channel. When the voice call is completed, the data call is reallocated to both channels, bringing the data rate back up to 128 kilobits such that both channels are used simultaneously to process a single data call. Alternatively, the B channels can be allocated to process voice on one of the B channels, or data on one or both of the B channels. A power supply with a circuit to ring a telephone is provided which allows an analog telephone to be used with the PC and the ISDN interface, thereby saving the user the expense associated with the purchase of an ISDN telephone. Further, the analog telephone is usable when the PC is powered off. The PC card is also programmable to allow users to create customized monitor screens for various call processes, and to update a flash ROM through the PC or the network. The PC card is provided with both a communication protocol processor and a digital signal processor. The digital signal or applications processor is programmable to provide data compression, encryption and Group 4 facsimile, among other applications. Further, the digital signal processor is programmable to emulate an analog modem by transforming data to be sent to a public switched network into a digital u-Law representation of an analog signal.

BRIEF DESCRIPTION OF THE DRAWINGS

These and other features and advantages of the present invention will be more readily apprehended from the following detailed description when read in connection with the appended drawings, in which:

FIGS. 8 and 9 are schematic diagrams of conventional CCITT of V.22 bis standard 2400 baud, full duplex modem transmitter and receiver, respectively;

FIGS. 16A and 16B are flow charts depicting the sequence of operations for adding a B-channel to an existing B-channel communication group;

FIGS. 17A and 17B are flow charts depicting the sequence of operations for deleting a B-channel from an existing channel group.

DETAILED DESCRIPTION OF THE PREFERRED EMBODIMENTS

Figure 1:
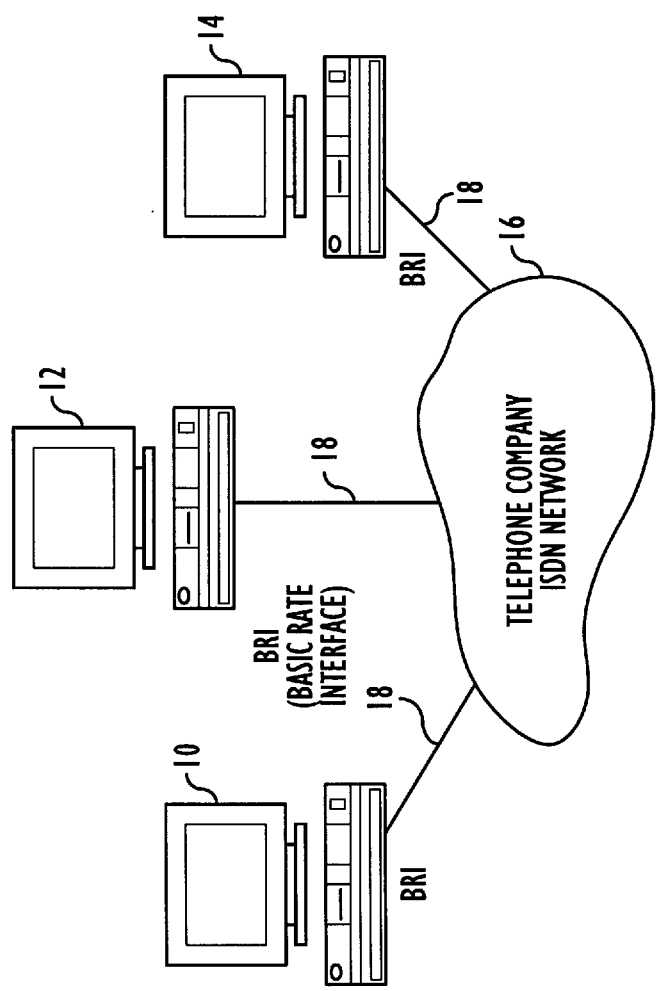
FIG. 1 depicts several personal computers (PC) connected to an integrated services digital network (ISDN)

With reference to FIG. 1, a plurality of personal computers 10, 12 and 14 are connected to an ISDN 16 via a basic rate interface (BRI) 18 which comprises two 64 kilobit per second (kbps) B channels and one 16-kbps D channel. In accordance with the present invention, a personal computer (PC) ISDN interface card is provided which can be inserted into a slot in a PC (FIG. 3) to establish a BRI between the PC and the ISDN 16. The PC can access the PC ISDN interface card, which is hereinafter referred to as the PC card, via the PC bus using three different methods: (1) by using programmed input/output (I/O) for control information; (2) by using expanded memory addressing (EMS) or direct memory access to shared memory; and (3) by using I/O for COM port and control functions. The ability of the PC to communicate with the PC card is necessary because, among other reasons, some of the software required to operate PC card components and to perform PC card functions is located in both the PC, e.g., the system ROM and RAM, and in PC card memory devices. The PC card hardware will be described first in connection with FIGS. 2 through 4. The PC card software will be described in connection with FIG. 5.

Figure 2:
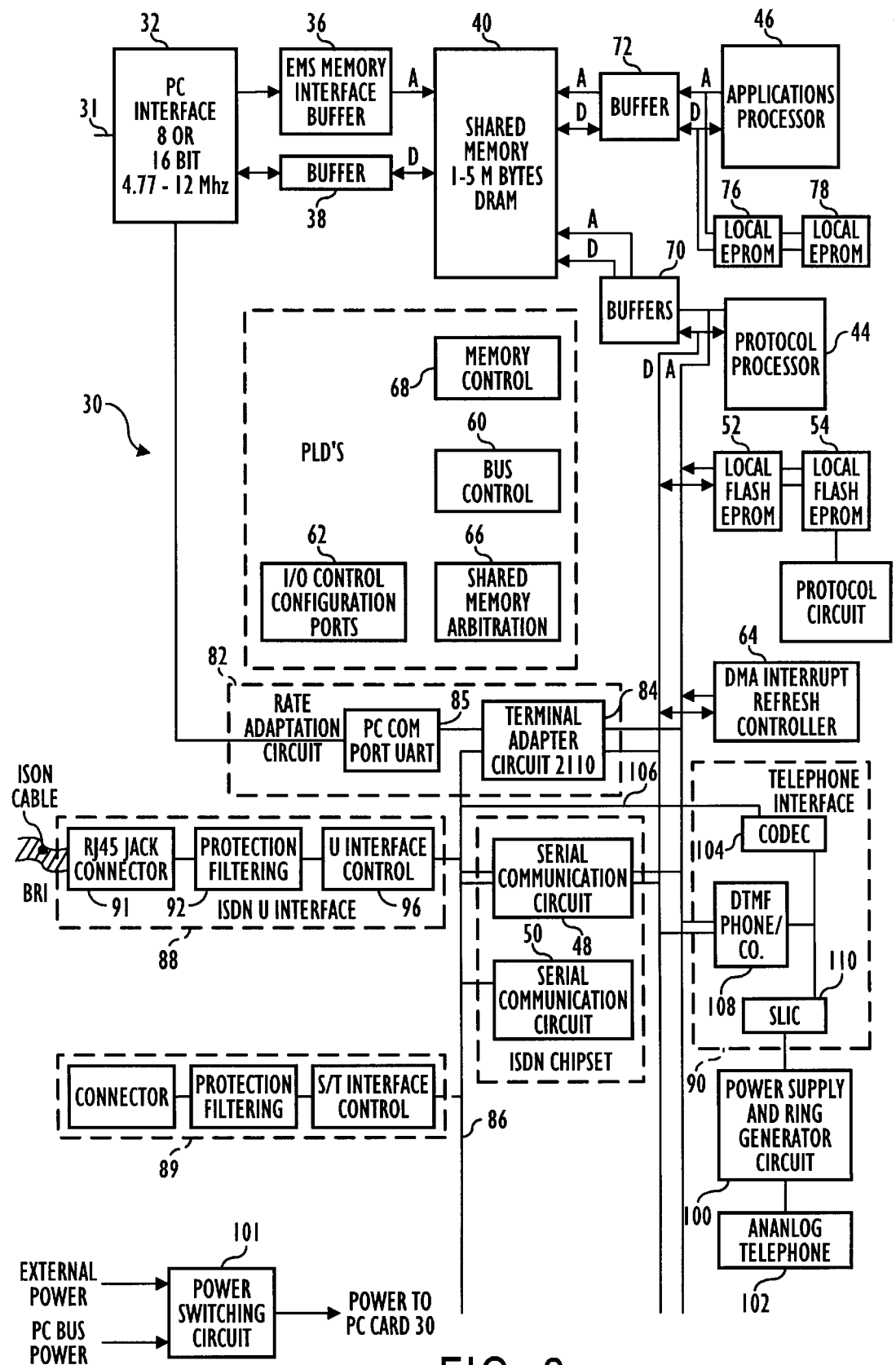
FIG. 2 is a schematic diagram of a PC card constructed in accordance with the present invention to provide an interface between a personal computer and an ISDN.

With reference to FIG. 2, expanded memory on the PC card 30 is accessed by the host processor in the PC through a PC interface 32. The electrical characteristics of the PC interface 32 conform to the IEEE standard for a Personal Computer bus. The interface conforms to the requirements of an IBM AT Personal Computer. The PC interface 32 configures the PC card for use with either an 8 bit or 16 bit bus, whichever is available in the PC, through autosensing. Accesses from the PC bus can be through a conventional expanded memory interface such as the EMS memory interface 36, which conforms to the LIM 3.2 standard for access control, or through programmed input/output (I/O). The PC card can be used with an IBM PC-AT or PC-XT or other compatible computer. The EMS standard memory interface 36 and a buffer 38 are provided for access a shared memory 40 through the host system on the PC and to sample, cycle and buffer bus data at the PC interface connector 34 in preparation for storage or retrieval to or from the shared memory 40 or I/O ports on the card. The shared memory 40 preferably comprises a 32-bit bank of 256×4 kilobytes dynamic random access memories (DRAMs) and is expandable to two or five megabits of memory. A DRAM controller (not shown) associated with the shared memory controls the respective cycles of the DRAMs to support 8, 16 and 32 bit accesses. Accesses to the DRAMs are arbitrated by a cycle arbiter circuit described below.

The shared memory 40 can also be accessed by two processors provided on the PC card. In accordance with the present invention, a microprocessor 44, e.g., a 16 bit BOC186EB (186) processor manufactured by Intel, is provided on the PC card 30 for handling communications protocol and general processing functions for the support of other PC card components. Another microprocessor 46, which may be a TMS320C31 digital signal processor manufactured by Texas Instruments, is provided on the PC card for applications processing such as data compression and conversion using various coding techniques. Processor interlocking between the microprocessors 44 and 46 can be supported. Application and protocol processors 46 and 44 each have programmed I/O pins which control locking of memory. If signals are present on these pins while one of the processors has requested and been granted access to memory, the arbiter will prevent the other processor from accessing memory until this signal is removed. The provision of two processors on the PC card allows for a number of advantages over existing PC-based ISDN interfaces. For example, the PC card of the present invention is configurable to perform network data compression and decompression, data encryption, voice recognition, and facsimile and modem functions, in addition to rate adaption and other processes associated with ISDN interfacing.

The protocol processor 44, application processor 46 and PC bus can all interrupt each other using programmable input/output (I/O) pins. Protocol processor interrupts are also used by I/O circuits described below as indicators for transferring data between the PC card 30 and the ISDN network 16. Programmable chip selects on the protocol processor 44 are used to select DRAMs located in the shared memory 40. The protocol processor 44 preferably has access to the first megabyte of the shared memory 40. The programmable chip selects are also used to select serial communication circuits 48 and 50, and to select flash read only memories (ROMs) 52 and 54. Programmable I/O bits in 62 are used to generate and clear interrupts to and from the PC and the applications processor 46. The protocol processor 44 also comprises eight programmable I/O port bits for performing such functions as controlling a diagnostic light emitting diode (LED), reading the status of interrupts to the PC and the applications processor 46, and enabling the PC serial port. Processor 44 allows autobauding for rate adaption or, optionally, for a Non-Maskable Interrupt (NMI). A second timer provides a clock for the refresh rate timer in the DMA/interrupt/refresh controller 64. A third timer is used by the protocol processor as a real time clock. Programmable logic devices (PLDs) for implementing functions 60, 62, 66 and 68 are provided on the PC card and configured to control bus operations, and port configuration and I/O operations, memory, control and arbitration, respectively. The PLDs provide control signals for controlling and enabling the address and data bus buffers associated with the applications processor 46, protocol processor 44, and PC bus interface.

The DRAMs in the shared memory 40 are fully addressable by direct memory access (DMA) from the serial communications circuits 48 and 50 through the DMA/Interrupt/Refresh Controller 64. The DRAMs are also fully addressable from the applications processor 46. Thus, the applications controller 46 and the ISDN serial communications circuits 48 and 84 are able to address the full range of installed DRAM directly.

On the other hand, the DRAMs are preferably only partially addressable by the protocol processor 44 and the PC bus. The first megabyte of DRAM in the shared memory 40 is mapped into the address of the protocol processor 44. The remainder of any installed DRAM is not addressable by the protocol processor 44. The EMS memory interface provides one to four pages, separately enabled, each of which is capable of addressing 16 kilobytes of DRAM. The addressed portions of DRAM are mapped into segment C000, C800, D000 or E000h of the PC's address space in RAM. These pages are mapped into the shared memory space in the first four Megabytes on the 16 Kbyte boundaries.

The protocol processor 44 is coupled to a DMA/Interrupt/Refresh controller 64, which is preferably an 82370 integrated circuit manufactured by Intel, that refreshes DRAMs located in the shared memory 40, and controls DMA transfer of data between the shared memory 40 and the serial communication chips 48 and 84. The DMA/Interrupt/Refresh controller 64 performs arbitration between the DMA and refresh requests. The shared memory cycle arbiter PLD 66 performs arbitration between the DMA and refresh requests of the DMA/Interrupt/Refresh Controller 64, and the other PC board components (e.g., the applications processor 46, the protocol processor 44 and the PC bus 31). The memory controller PLD 68 decodes the addresses asserted by the processors, and asserts the appropriate row and column DRAM address strobes (RAS, CAS). RAS and CAS are generated according to standard DRAM timings. Control signals are also provided that indicate memory cycle timing to the cycle arbiter. The shared memory cycle arbiter PLD gives the next cycle to the highest priority requestor for memory access. Buffers 70 and 72 are provided at the address and data lines associated with the protocol processor 44 and the applications processor 46, respectively. The highest priority is given to the DMA and refresh requests performed by the DMA/Interrupt/Refresh Controller 64, and lower priority is given to the applications processor 46, the protocol processor 44 and the PC bus 31 which are serviced in a round robin manner. The shared memory cycle arbiter PLD 66 provides a memory cycle to a requestor by enabling corresponding address and data buffers for the selected requestor (e.g., the data buffer 38 and the address buffers associated with the EMS memory interface 36, the buffer 70 or the buffer 72) to start the memory cycle. When read data is available or write data has been written, the data is latched into one of these local buffers. A ready signal is subsequently provided by the PLD 66 to the requesting processor allocated the current cycle. DRAM access latency periods are reduced by latching the data from the DRAM using one of these buffers as soon as the data is available, thereby releasing the shared memory 40 for access by another device, keeping the data present on the local bus of the current device while finishing its memory cycle. A substantial amount of time is saved because each requesting device requires additional clock cycles to complete its memory access.

The applications processor 46 on the PC card 30 performs computation intensive application processing such as compression, encryption and coding. For example, the applications processor 46 can generate $\mu$-Law or a-Law encoded data at the PC for transmission to a central office (CO) and thereby reduce errors which can be introduced into data streams by the analog encoding and decoding processes associated with conventional analog modems. The applications processor 46 has access to the entire shared memory 40, and to two local EPROMS 76 and 78. The applications processor 46 can interrupt the protocol processor 44 and the PC bus 31 through programmable I/O bits. The applications processor 46 can also be interrupted by the protocol processor 44, the PC bus and the DMA/Interrupt/Refresh Controller 64. The applications processor 46 comprises cache memory, two dual access RAM blocks, data and address arithmetic logic units (ALUs), a single channel DMA unit and an interrupt controller. The application processor 46 executes data transfers to and from its EPROMs 76 and 78 using a full 32 bit data path without contention. The applications processor 46 uses a 32 bit data path to access the DRAMs in the shared memory 40. These memory accesses are subject to wait states from other devices performing simultaneous accesses. The cache and RAM blocks reduce the impact of DRAM interface latencies. The application processor 46 is therefore equipped for word accesses to the shared memory 40.

With further reference to FIG. 2, the DMA/Interrupt/Refresh Controller 64 comprises an 8 channel DMA controller for transferring data between the shared memory 40 and the serial communication chips 48 and 84. The 8 channels are allocated as follows: Channels 0 and 1 are used for B1 channel transmit and receive operations, respectively; channels 2 and 3 are used for B2 channel transmit and receive operations, respectively; channels 6 and 7 are used for the terminal adapter 84 channel transmit and receive operations, respectively; and channels 4 and 5 are unassigned. Thus, each of the ISDN data channels (e.g., the B1, B2) and terminal adapted data from the PC Com ports 85 is assigned a pair of DMA channels, one for transmit buffers and one for receive buffers. The two unassigned DMA channels 4 and 5 can be programmed for moving blocks of data between two areas in the shared memory 40.

The serial communication and terminal adapter circuits 48 and 84 each comprise four full duplex serial channels. Each channel operates as a DMA interface and an interface or programmed I/O to the protocol processor 44. Each serial communications circuit 48 and 50 is operable to transmit and receive data with a first-in-first-out (FIFO), to detect time slot assignments and collisions. The serial communications circuit 50 controls link access procedure using Link Access Protocols for the B and D channels (e.g., LAP-B and LAP-D). Additional functions of the serial communications circuit 50 include control of the IOM bus 86, such as MON 0, D, C/IO, and MR/MX channels.

The PC card 30 comprises a rate adaption circuit 82 for allowing a standard synchronous serial communication port to transfer data over an ISDN network. A terminal adapter circuit 84, such as a 2110 integrated circuit manufactured by Siemens, is provided to implement rate adaption standards such as X.30, V.110, ECMA.102, V.120, and DMI. The terminal adapter circuit has three interfaces. The first interface, a DTE interface, generates signals required for interfacing with a PC type COM port. Data is provided to the DTE interface by a PC COM port universal asynchronous receiver/transmitter (UART) which is coupled to the PC interface 32. Thus, asynchronous data rates between 300 bits per second to 38,400 bits per second can be supported by the PC card. A synchronous network interface is provided on the terminal adapter circuit 84 to create an interface to an IOM-2 bus 86 described in further detail below. Finally, the terminal adapter circuit 84 has a microprocessor interface for transferring programming information and data between the terminal adapter circuit and the protocol processor 44. The terminal adapter circuit 84 is operable in transparent and nontransparent modes. The terminal adapter circuit 84 operates in a transparent mode for low level protocols such as V.110, wherein data is framed autonomously and provided directly from the PC interface 32 to the IOM-2 bus 86. In package-based applications such as V.120, the terminal adapter circuit 84 operates in a nontransparent mode in which data is read from the terminal adapter 84 using the protocol processor 44 and placed into a memory device. The data is subsequently packetized and written from the memory device to the terminal adapter circuit 84 or the B channel serial communications circuit 84 for transmission on the IOM-2 bus 86 to the central office via an ISDN U or S/T interface 88.

The ISDN U interface 88 is provided on the PC card 30 as a separate, piggyback card mounted on the PC card. The piggyback card comprises an RJ45 jack 91, line protection circuitry 92, and a U interface control circuit 96. Alternatively, the piggyback card can be replaced by an ISDN S/T interface piggy-back card 89 which is depicted by broken lines in FIG. 2. The ISDN U interface 88 provides a direct connection between a two binary, one quaternary (2B1Q) U interface line from the central office (CO). The ISDN U interface 88 is coupled by a transformer (not shown) to a central office two wire ISDN interface or BRI cable. The protection/filtering circuit 92 comprises protection circuits for overvoltage transient conditions. The U interface control circuit 96 decodes data from the CO and places the data on the IOM-2 bus 86, along with a clock that is phase locked to the CO. Furthermore, the U interface control circuit 96 receives data from the PC card via the IOM-2 bus 86, encodes the data and sends the coded data to the CO. Thus, communication between the ISDN U interface and the protocol processor 46 occurs over the IOM-2 bus 86. The U interface control circuit 96 multiplexes data into frames containing two "B" channels, a "D" channel and six overhead or maintenance bits. A superframe comprises eight of these multiplexed frames and therefore comprises twenty-four maintenance bits. During each superframe, the maintenance bits are used to send commands, status data, and CRC bits. The commands allow a variety of functions to be formed such as activation/deactivation, loopbacks and status queries.

As stated previously, data and control information is exchanged between the PC card 30 and a CO through the U interface chip 88. The CO data is distributed to various PC card components over an ISDN oriented modular (IOM-2) interface bus. The IOM-2 bus is time division multiplexed such that one frame is sent every 125 microseconds. The bus comprises four wires including data upstream (DU) to the CO, data downstream (DD) from the CO, frame synchronization clock (FSC) and a data clock (DCL) which runs at twice the bit rate. Each frame consists of 32 bit channels as defined in Table 1.

TABLE I

IOM-2 BUS FRAME FORMAT
CHANNEL O

| FUNCTION | BITS | LENGTH |
| --- | --- | --- |
| B1 | 0–7 | 8 |
| B2 | 8–15 | 8 |
| Mon 0 | 16–23 | 8 |
| D | 24–25 | 2 |
| C/I0 | 26–30 | 4 |
| MR/MX | 31–32 | 2 |

CHANNEL 1

| FUNCTION | BITS | LENGTH |
| --- | --- | --- |
| IC1 | 0–7 | 8 |
| IC2 | 8–15 | 8 |
| Mon 1 | 16–23 | 8 |
| C/I 1 | 24–30 | 6 |
| MR/MX | 31–32 | 2 |

CHANNEL 2

| FUNCTION | BITS | LENGTH |
| --- | --- | --- |
| Reserved | 0–23 | 24 |
| C/I 2 | 24–30 | 6 |
| Reserved | 31–32 | 2 |

With reference to Table I, the B1 and B2 channels provide two 64 kps user data channels to and from the ISDN network 16. Monitor 0 and monitor 1 channels represent two programming channels used to program input/output devices on the IOM-2 bus 86. Each monitor channel has a pair of handshake bits, MX and MR, for controlling signal flow. The D channel is a 16 kps channel for providing a connection between OSI layer 2 and layer 1 components. Three C/I channels (e.g., C/I 0, C/I 1, C/I 2) provide real time status data between devices connected to the IOM-2 bus, such as loopback requests, link procedures and maintenance commands. Two intercommunication (IC) data channels provide 64 kps data path between user devices. A terminal IC (TIC function) is implemented using 4 bits of the C/I 2 channel to allow multiple layer 2 devices to individually gain access to the D and I/C channels. An analog phone interface 90 is coupled to the IOM-2 bus as well as to the data and address bus of the protocol processor 44.

The analog telephone interface 90 provides a standard two-wire (e.g., tip and ring signal) current loop connection between an analog telephone and the PC card 30. The PC card 30 operates in connection with an external power supply and ring generator circuit 100 to perform interface functions required between a POTS (plain old telephone service) telephone 102 and an ISDN line. If the power supply is not powered on, the card is powered by the PC and the phone is not operational. A power switching circuit 101 on the card switches between the external supply and power from the PC bus.

The protocol processor 44 performs the ISDN related functions for establishing a voice connection for the POTS telephone 102. Digital data going to and coming from a central office is processed by the ISDN U or S/T interface 88 and placed on the IOM-2 bus 86. The CODEC 104 in the telephone interface 90 receives the data over the IOM-2 bus 106. The CODEC converts incoming digital data into an analog voltage and also converts an outgoing analog voltage into digital data. A DTMF circuit 108 is provided to detect tones from the CO or SLIC 110. When these tones that represent the keys on the phone are detected, an interrupt is given to the protocol processor. The protocol processor can then read an 8 bit value which specifies the key detected. A subscriber loop interface circuit (SLIC) is provided to convert the CODEC four-wire transmit and receive interface to a two-wire standard telephone interface for providing tip and ring signals to the power supply and ring generator circuit 100 through a DB15 standard 15 pin connector and cable. In addition to the tip and ring signals from the SLIC, the power supply 100 also receives a control signal from the SLIC 110 which enables the ring voltage to be sent to the analog telephone 102 as described below.

The power supply and ring generator circuit 100 will be described in further detail with reference to FIGS. 3 and 4. The power supply and ring generator circuit 100 provides power to the PC card 30 and generates the ringing voltage for the analog POTS telephone 102. The power circuit 100 is operable to provide the PC card with operating voltages while the host system or PC is powered off. The power circuit 100 therefore allows the telephone 102 to initiate and receive telephone calls, and the protocol and applications processors 44 and 46 to perform any non-PC related features, when the PC is powered off. The PC card is preferably powered by the external power supply only and does not draw any power from the host system when the power supply is on. The power switching circuit 101 on the card switches between the external supply and power from the PC bus automatically when the external supply is turned off.

Figure 3:
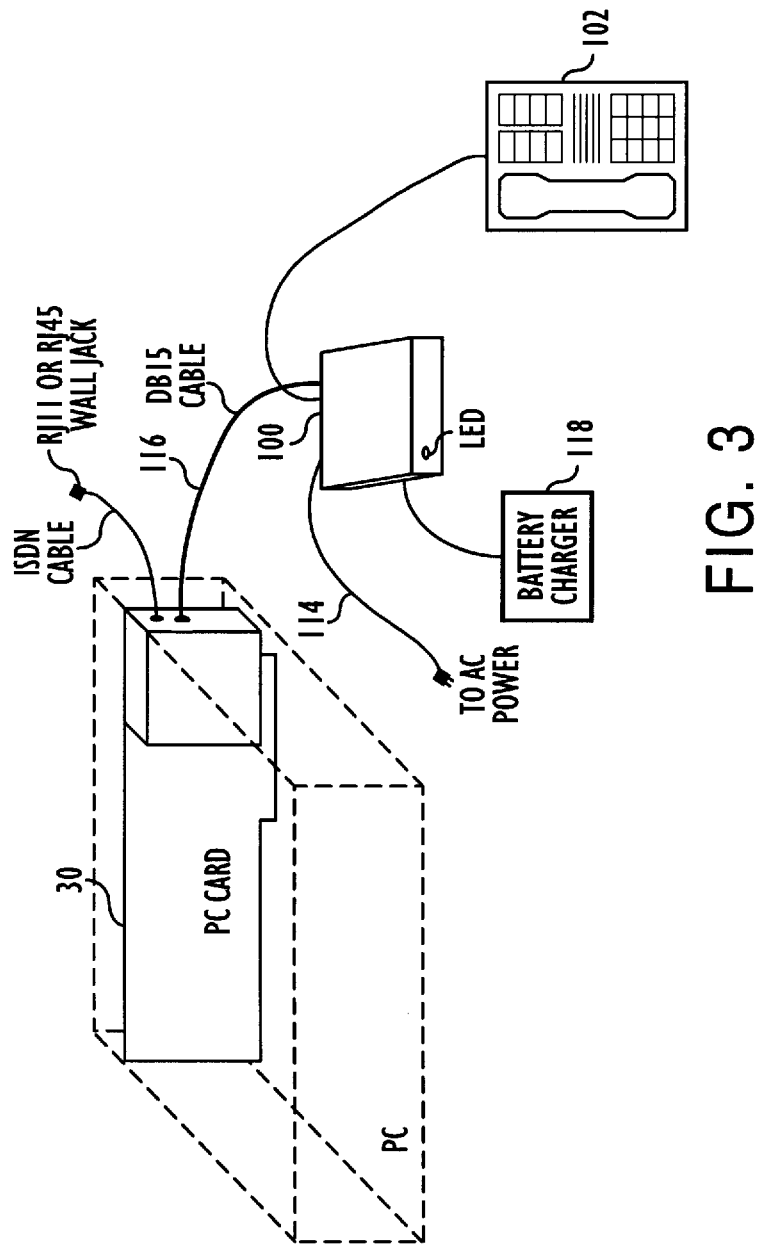
FIGS. 3 and 4 is a schematic diagram of a power supply and ring generator circuit constructed in accordance with the present invention.

With reference to FIG. 3, the power circuit 100 receives its primary power from a standard AC wall outlet (not shown) through an AC power cord 114. The power supply 100 preferably provides DC voltages of +5 volts, −5 volts and −48 volts to the PC card 30 through an external DC cable 116, e.g., a standard DB15 cable. The power circuit 100 generates a 90 volt AC signal at 20 HZ and switches the AC voltage to the analog telephone 102, which is connected directly to the power circuit 100. The high voltage AC signal that is required to ring a telephone is therefore eliminated from the PC card 30. Consequently, the PC card 30 does not have to be insulated and otherwise isolated from other PC components in order to meet, for example, Underwriter's Laboratory (UL) safety requirements. Thus, a substantial reduction in cost is realized by providing a ring generator circuit on the power supply and therefore separate from the PC card. The A/C voltage is sufficient to ring three of Western Electric Series 2500 type telephones having Ringer Equivalence Number 3.0A.

The power circuit 100 comprises a connector for an external battery/charger circuit 100, which can supply power to the PC card for a limited amount of time during AC line dropouts or failures. The battery is preferably a rechargeable lead acid type battery with a nominal rating of 12 volts. In addition to three DC voltage signals of +5, −5 and −48 volts, respectively, and a 90 volt AC signal, the power supply generates a 13.8 volt DC signal which can be provided to the external battery/charger circuit 118 to charge the circuit when the supply is powered from the AC line 114.

Signaling required to operate the power supply and ring generator circuit 100 will now be described with reference to FIG. 4. Tip and ring signals from the SLIC 110 are provided to a relay 120. A ring control signal is generated by the telephone interface circuit 90 and provided to the power supply and ring generator circuit 100 via the associated DB15 cable therewith after the CODEC 104 has been enabled by the protocol processor 44. The ring control signal is applied to the relay 120 and a ring generator 122 to enable these components. When the ring control signal is active, the tip signal from the PC card is disconnected from the telephone 102, and the ring voltage generated by the ring generator 122 is applied to the telephone's tip line by the relay 120 to operate a ringing circuit in the telephone. When the telephone 102 goes off-hook, a loop current is detected by the SLIC 110 which immediately deasserts the ring control signal and interrupts the protocol processor 44. Consequently, the relay 102 terminates the application of the ring voltage from the ring generator 122 to the telephone, and reconnects the telephone's tip signal to the PC card. The protocol processor 44 operates the telephone interface 90 to terminate the ring control signal request. The ring control signal is preferably an active low signal with a conventional duty cycle of two seconds on and four seconds off. The ring control signal, however, can be varied to support distinctive ringing to differentiate, for example, between a number in a file on the PC card and one that is not. The control processor 44 uses its internal timer to determine the length of time that the ring control request signal which is sent to the SLIC 110 is active. This time can be varied based on preprogrammed factors, and thus result in distinctive ring sounds.

Figure 4:
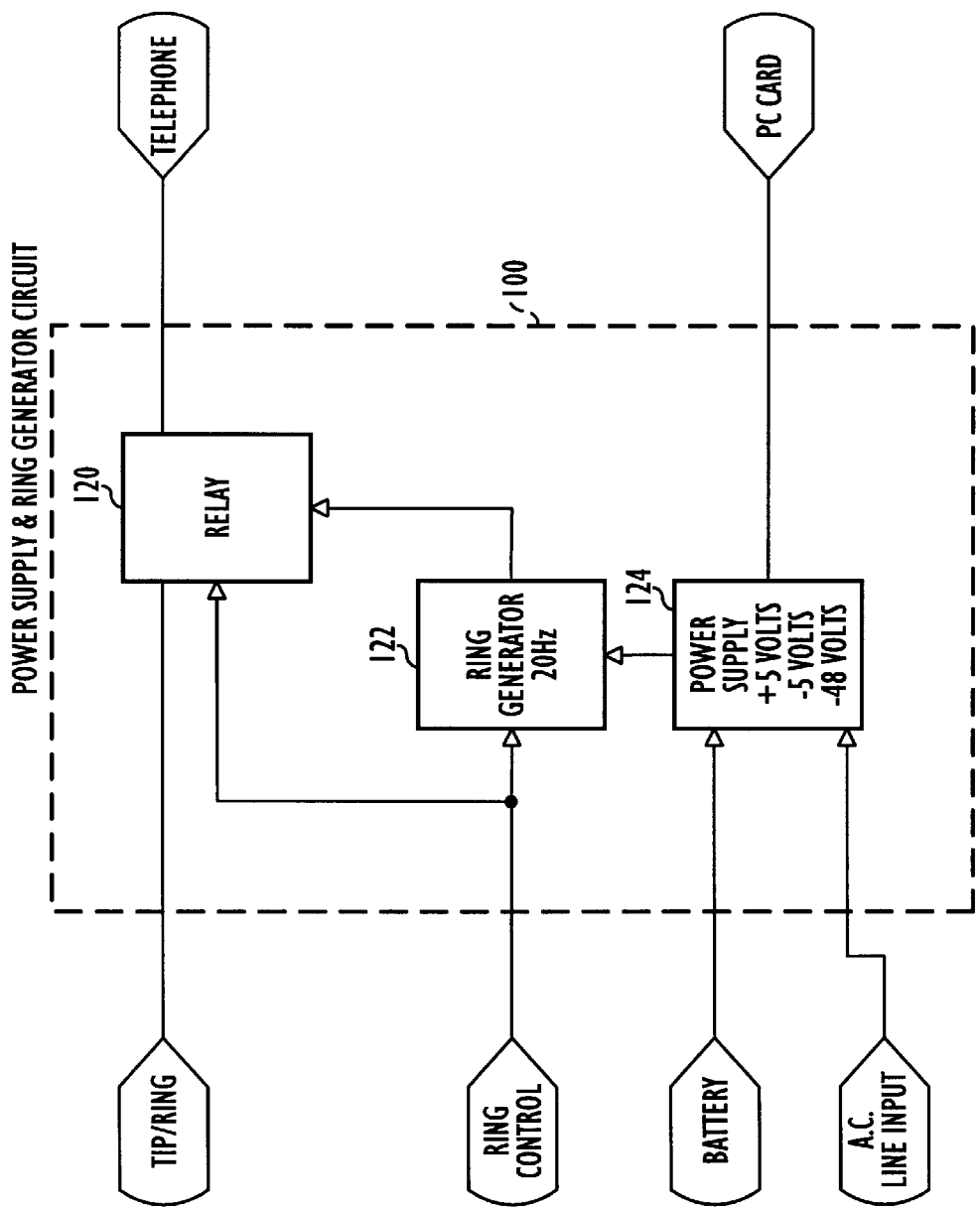

With further reference to FIG. 4, a conventional power supply 124 is provided to generate the D/C voltage signals of +5, −5 and −48 volts required for the PC card, an appropriate ring generation signal, and a 13.8 volt signal for use by the battery charging circuit 118. The power supply receives a power signal from an AC wall outlet or from a battery in the event of an AC line outage. The power supply 124 is provided with conventional overvoltage, undervoltage and overload protection.

As stated previously, the DC cable between the PC card and the power supply and ring generation circuit 100 is preferably mounted to the power circuit 100 by a 15 pin DB15 standard connector. Pin assignments for the connector generally include pins for the tip signal, the ring control signal, the ring signal, ground signals, and a number of pins for providing +/−5 volts to various components on the PC card. As shown in FIG. 3, the PC card receives data signals from the network by a standard 8 position RJ45 jack mounted on the piggyback card. The power supply and ring generator circuit 100 is preferably provided with an RJ11 jack for use with the analog telephone 102.

The program code for controlling the PC card comprises firmware on the PC card (e.g., the program code stored in the ROMs of the protocol and applications processors 44 and 46) and software downloaded to the shared memory. The PC also executes software programs such as a call manager, which is described in further detail below, and a modem interface to the PC card. The PC software also comprises lower-level programs for supporting the PC card during voice and data transmissions such as NETBIOS, a packet driver, a transport control protocol/internet protocol (TCP/IP) routine and an applications programmer interface SDK/API.

Figure 5:
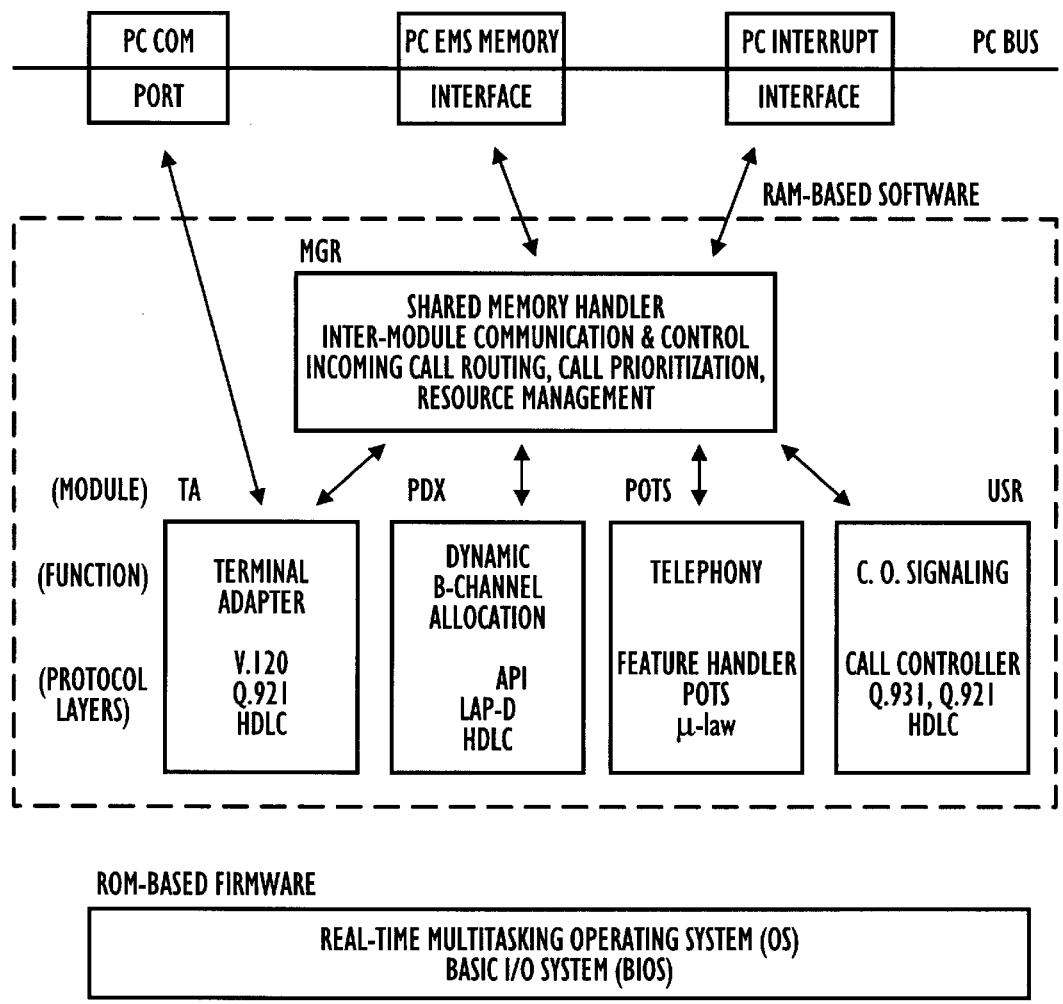
FIG. 5 is a schematic diagram of software programs associated with the PC card of the present invention.

The firmware for controlling a number of PC card operations will now be described in connection with FIG. 5. The firmware comprises a real-time multitasking operating system (OS) 130 or Kernel and a basic input/output system (BIOS) 132 stored in the protocol processor 44 flash EPROM. Boot and debug utilities and a power-on self-test are also stored in the flash EPROM. The PC downloads to the protocol processor 44 shared memory a number of software modules such as a terminal adapter module TA, a module for dynamically allocating B-channels PDX, a module for controlling the analog telephone POTS and related telephony processes, and a central office (CO) signaling module for controlling network call processes. MGR is used to control access to the ISDN Q.931 software. It is also responsible for resource management and routing of incoming calls to the appropriate application. Accordingly, the protocol processor is provided with a kernel module for coordinating RAM-based software module accesses to the shared memory and for controlling inter-module communications and control functions. The terminal adapter module allows for PC communication with the PC card through the PC COM port, as well as through accessing the shared memory. As indicated by the two arrows associated with the TA module in FIG. 5, the TA module can control both the rate adaption circuit 82 and the PC interface 32 in order to control data transfer through the PC core port to the PC card.

Figure 6:
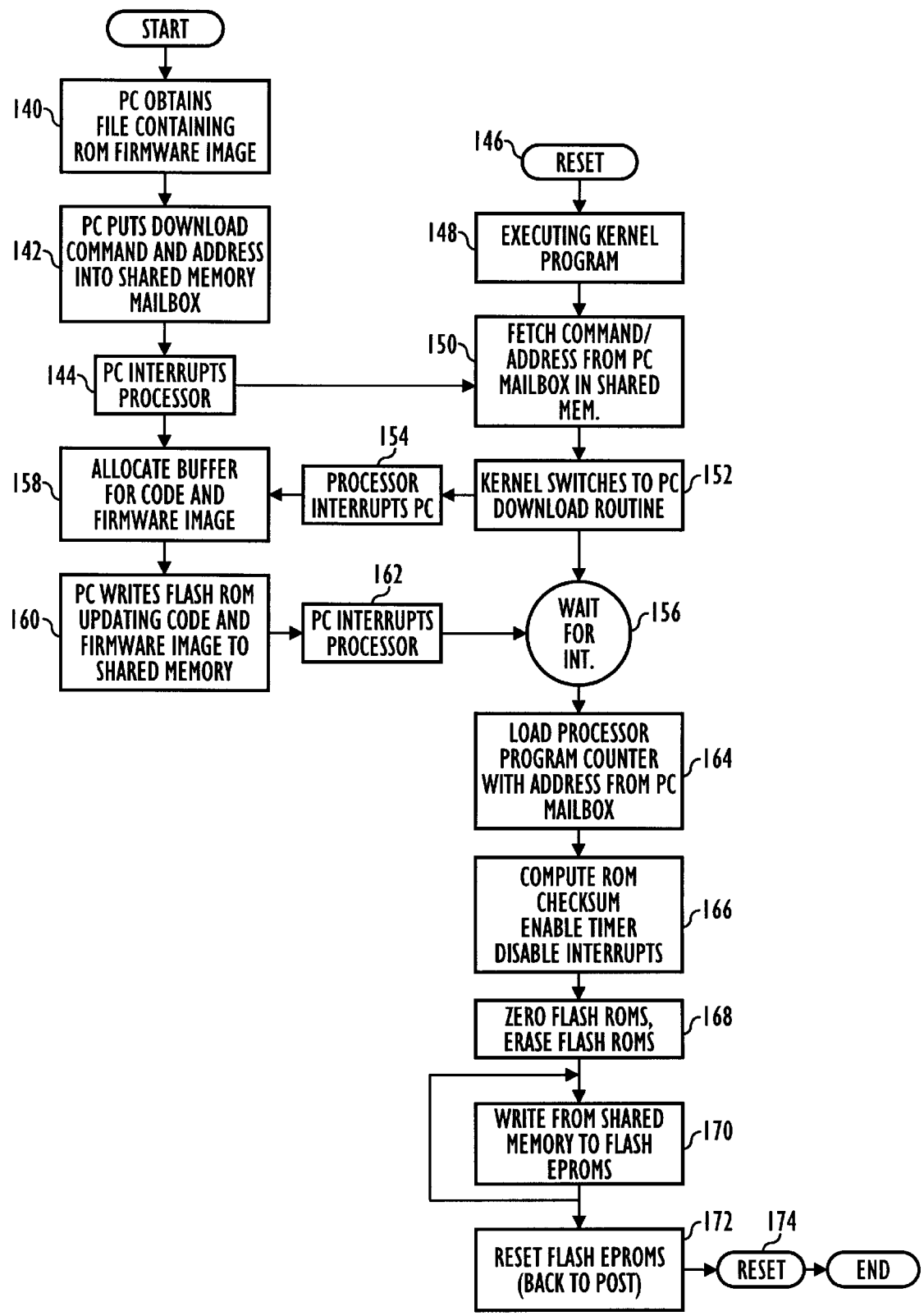
FIG. 6 is a flow chart depicting the sequence of operations for updating a flash EPROM on the PC card through the PC.

The interaction between the shared memory, the firmware stored on the protocol processor ROM, and the software that is downloadable from the PC is illustrated in FIG. 6. FIG. 6 is a flowchart of the sequence of operations that are required to update the protocol processor ROM through the PC. The other software modules interact with the shared memory 40 and the PC in a similar manner.

The PC card 30 can update or change on-board software and firmware dynamically from within the circuit and under microprocessor control. For example, the PC card can update an entire subroutine or modify software parameters and variables. Firmware updating can be accomplished through the PC or through the ISDN network 16. With reference to FIG. 6, a software update through the host processor of the PC begins with the process of obtaining a file containing a ROM firmware image from, for example, a floppy disk file, hard disk file, or file that has been downloaded into the PC RAM, as shown in block 140. As indicated in block 142, the PC accesses the shared memory 40 through the EMS memory interface 36 to store a download command and an address into a mailbox in the shared memory 40. The kernel in the protocol processor supports a communication mailbox in the shared memory that allows the PC and the network I/O devices (e.g., the U interface 96 and serial communications circuits 48 and 50) to exchange commands in order to perform a variety functions and to transfer control.

With further reference to FIG. 6, the protocol processor 44 retrieves and executes code from the flash ROMs 52 and 54, and completes a self-test routine to test the PC card components after being reset, as shown in block 146. After self-testing PC card components, the protocol processor 44 executes the kernel program until an interrupt is received from the PC, as indicated in block 148. With reference to blocks 150 and 152, the protocol processor 44 retrieves the download command and address from the shared memory mailbox after receiving an interrupt from the PC. Alternatively, the kernel can poll the communication mailbox until the download or other command is posted. The kernal code, still executing out of flash ROM, then dispatches to the PC download routine 152, and interrupts the PC to begin the download 154. The protocol processor then waits for an interrupt from the PC 162 and 156 to indicate that the PC has copied the firmware image and control code to the buffer in shared memory 158 and 160.

The PC allocates a sufficient amount of memory space in the shared memory to serve as a buffer for the flash ROM updating code and firmware image, as shown in block 158 of FIG. 6. The PC writes the data to the allocated buffer in the shared memory 40, beginning at the memory address specified in the mailbox, using the EMS memory interface 36, before interrupting the protocol processor 44, as shown in blocks 160 and 162.

With reference to block 164 in FIG. 6, the protocol processor 44 loads its program counter with the address stored in the PC mailbox after the processor has been interrupted by the PC. This switches the protocol processor from executing out of flash ROM to executing from the shared memory the code that was just downloaded. As shown in block 166, the protocol processor computes the checksum of the ROM image in the shared memory to ensure that the firmware image was accurately copied into the shared memory. The protocol processor also sets a timer to count delay periods used by the flash EPROM programming algorithm. Further, the protocol processor disables interrupts to ensure that no interrupts occur during flash EPROM programming. The protocol processor subsequently places zeros in the locations of the flash EPROM that are to be rewritten or the entire flash EPROM, as indicated in block 168. These locations are subsequently erased. As shown in block 170, the protocol processor writes the data that has been stored in the shared memory by the PC into the flash EPROMS in accordance with a flash programming algorithm such as the routine provided by the manufacturer of the flash EPROM. The protocol processor continues to execute the flash programming routine in a loop until the transfer of the stored updating data from the shared memory to the flash EPROMs is complete. The flash EPROMS and the protocol processor are subsequently reset, as indicated in blocks 172 and 174. The protocol processor 44 is now executing from the flash EPROM once again.

The process of updating PC card software through the ISDN 16 will now be described in connection with FIG. 7. As indicated in block 180, the PC accesses the shared memory 40 through the EMS memory interface 36 to store a download command and an address into a mailbox in the shared memory. The PC subsequently interrupts the protocol processor 44, as shown in block 182. The protocol processor 44 is executing code from the flash EPROMs 52 and 54, and completes a self-test routine to test the PC card components after being reset, as shown in block 184. The protocol processor operates in accordance with the kernel program until an interrupt is received from the PC, as shown in block 186. With reference to blocks 188 and 190, the protocol processor 44 retrieves the download command and address from the shared memory mailbox after receiving an interrupt from the PC. The kernel subsequently dispatches and begins processing the PC download routine, still executing from the flash EPROM. The protocol processor interrupts the PC to indicate to the PC to begin the download routine, and waits for an interrupt from the PC to continue processing, as indicated in blocks 192 and 193.

Figure 7A:
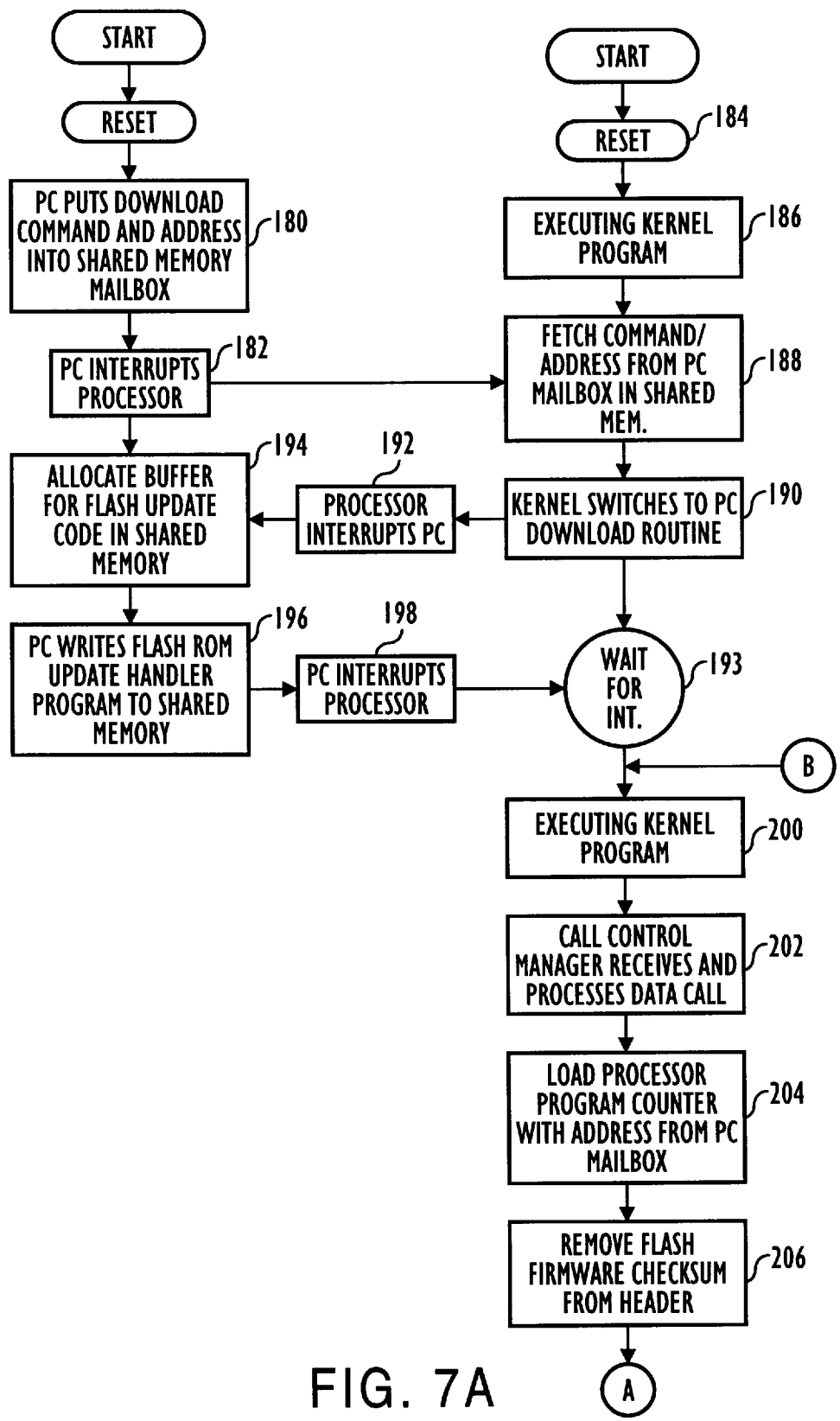
FIG. 7 is a flow chart depicting a sequence of operations for remotely updating the flash EPROM on the PC card through the ISDN.
Figure 7B:
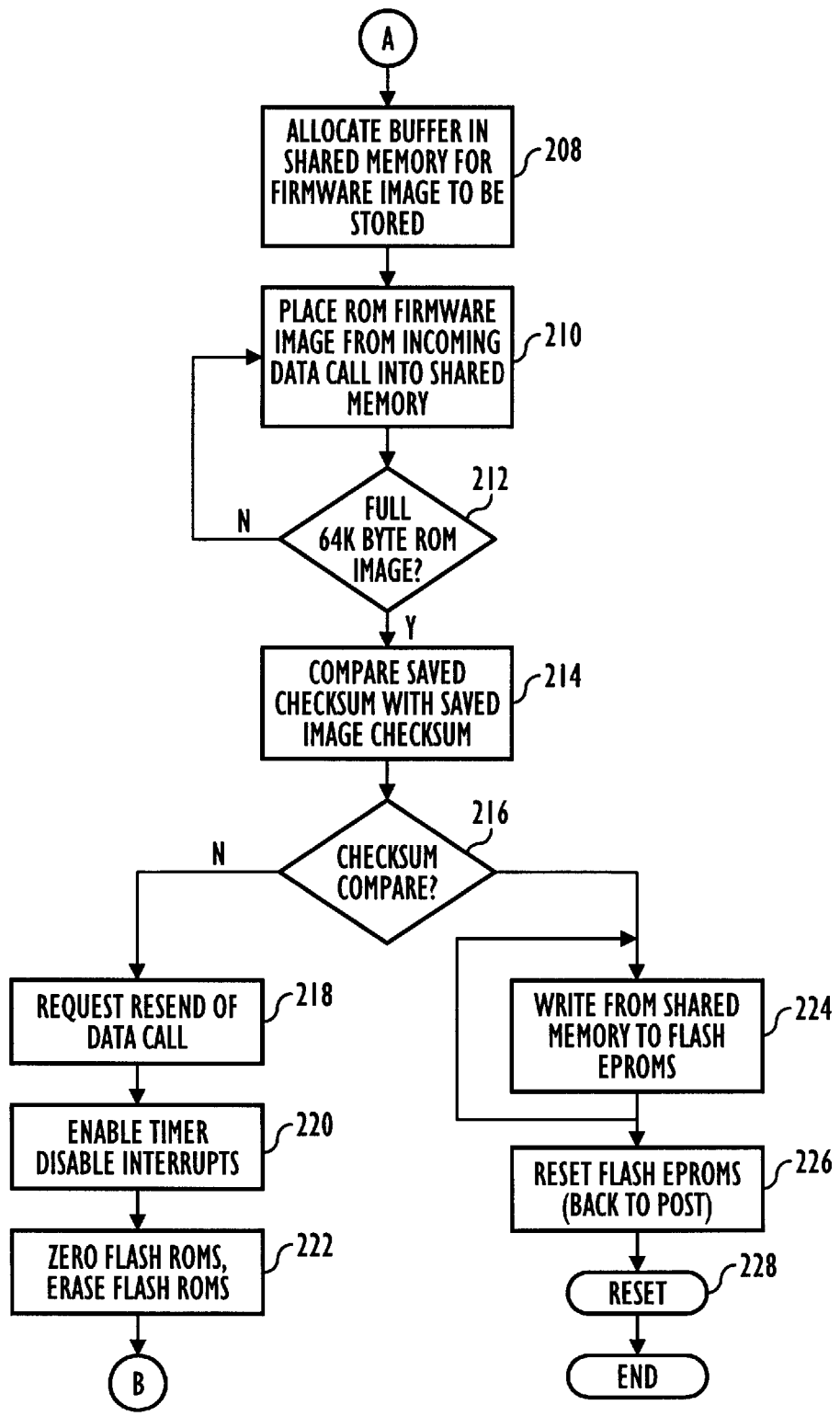

The PC allocates a sufficient amount of memory space in RAM to serve as a buffer for the flash EPROM updating code, as shown in block 194 of FIG. 7. The PC writes the data to the allocated buffer in the shared memory 40, beginning at the memory address specified in the mailbox, using the EMS memory interface 36 before interrupting the protocol processor 44, as shown in blocks 196 and 198.

The protocol processor 44 resumes operation under control of the kernel program until a data call is received, at which time the protocol processor operates in accordance with the call control manager program MGR (FIG. 5), as indicated by blocks 200 and 202. The call control manager program is a software program for handling incoming calls on the ISDN network 16 by interpreting and dispatching the calls to an appropriate lower-level software program designed to process a particular type of call. The call control manager program is distinguished from the call manager program MGR, that is, the user interface that processes calls. The protocol processor 44 processes the received data call containing the flash EPROM firmware image by decoding the header associated with the call. The call control manager program MGR dispatches the flash EPROM call to the flash update handler program stored in the shared memory.

With reference to blocks 204 and 206 in FIG. 7, the protocol processor 44 loads its program counter with the address stored in the PC mailbox and removes the flash firmware checksum from the decoded data call header. The firmware checksum is stored in memory by the protocol processor for subsequent computation. The protocol processor allocates a buffer in the shared memory 40 for storing the firmware update image transmitted by the data call, as indicated in block 208. The protocol processor 44 controls PC card hardware to collect data from the network into the serial communications circuit 48 and to subsequently write the data from the serial communications circuit 48 to the allocated buffer in the shared memory 40, as shown in block 210.

With reference to decision block 212, incoming data is sequentially stored in the shared memory buffer until 64 kbytes of the firmware image has been received and stored. The protocol processor 44 compares the stored checksum transmittted in a header along with the firmware with the computed checksum of the stored image, as indicated in block 214. As indicated by the negative branch of decision block 216 and block 218, the protocol processor 44 generates a request signal, which is transmitted to the originator of the data call containing the flash EPROM update information, to request that the data call be retransmitted. The protocol processor resumes operation under the kernel program, as shown in block 200, while waiting for the call control manager software to begin processing another incoming data call.

If the decision in block 216 is affirmative (e.g., the firmware image was accurately copied into the shared memory), the protocol processor 44 sets a timer to count delay periods used by the flash EPROM programming algorithm, and disables interrupts to ensure no interrupts occur during flash EPROM programming, as shown in block 220 of FIG. 7. The protocol processor subsequently places zeros in the portions of the flash ROM that are to be rewritten or the entire flash EPROM, as indicated in block 222. As shown in block 224, the protocol processor writes the data that has been stored in the shared memory into the flash EPROMS in accordance with a flash programming algorithm such as the routine provided by the manufacturer of the flash EPROM. The protocol processor continues to execute the flash programming routine in a loop until the transfer of the stored image from the shared memory to the flash EPROMs is complete. The flash EPROMS and the protocol processor are subsequently reset, as indicated in blocks 226 and 228.

As stated previously, the PC card of the present invention is provided with a protocol processor 44 and an applications processor 46 (e.g., a digital signal processor) as shown in FIG. 2. These processors allow the PC card to perform a number of functions that cannot be implemented on many existing PC-based ISDN interfaces using a single microprocessor. For example, the applications processor 46 can be programmed to emulate a digital modem, as will now be described.

A conventional CCITT V.22 bis standard 2400 baud, full duplex modem transmitter and receiver are depicted in FIGS. 8 and 9, respectively. The modem transmitter 240 comprises a 600 Hz clock 242 and counter 244 for a V.22 bis data encoder 246 and two sampling devices 248 and 250. Data to be transmitted is encoded by the data encoder 246 in accordance with the V.22 standard, and sampled by the sampling circuits 248 and 250 at an increased rate of 9600 Hz, before it is processed by raised cosines filters 252 and 254. The filter output signals are combined with the carrier signal by a frequency translator 256. The signal TXOUT that is to be transmitted along an analog telephone line is typically scaled by a scale factor 258 before it is converted from its digital format to an analog format by a digital-to-analog (D/A) converter 260.

The analog output signal from the conventional computer modem depicted in FIG. 8 is sent to a public central office (CO) over standard analog telephone lines. The output signal is converted at the CO to a digital format using the $\mu$-Law conversion algorithm or the a-Law conversion algorithm for the United States and Europe, respectively. The digital signal is converted to an analog signal again when the receiving CO transmits the signal over an analog line to the receiving modem. If a digital line is used for the transmitting modem to CO link, then the modem converts the digital data to an analog signal. An ISDN adapter subsequently converts the analog signal to an $\mu$-Law or a-Law digital format. This intermediate analog conversion process introduces additional possibilities for errors and requires additional circuitry.

The PC card of the present invention avoids the possibility of additional errors and the expense of additional circuitry associated with the aforementioned analog conversion process by programming the applications processor 46 (FIG. 2) to perform $\mu$-Law and a-Law conversion. The data from a transmitting PC in a digital format is converted to a digital representation of an analog signal directly and then sent to the CO, eliminating the intermediate analog conversions by the modem and the ISDN adapter.

Programming the applications processor 46 to implement a digital output modem in accordance with the present invention will be described with further reference to FIG. 8. Briefly, the scale factor 258 used with a conventional modem is replaced and the D/A converter 260 is eliminated. Digital filtering algorithms are provided in the applications processor 46 to convert the sampling rate of the TXOUT signal from 9600 Hz to a rate of 8000 Hz for the $\mu$-Law or a-Law conversion process. The rate conversion can be implemented by altering the operation of the sampling circuit or by implementing a variable rate filter in software for use with the raised cosine filters 252 and 254. The applications processor 46 is programmed to subsequently convert the signal having a sampling rate of 8000 Hz to $\mu$-Law or a-LAw format in accordance with the CCITT G.711 standard.

A standard modem receiver 264 is depicted in FIG. 9. Analog data from an analog telephone line is converted by an analog-to-digital (A/D) converter 266 and scaled by a scale factor 268 before being processed by a passband filter 270, a multiplier 272 for removing the carrier signal, and an adaptive equalizer 274. A V.22 bis standard timing recovery circuit 276 coordinates the operation of the filter 270, mulitplier, 272 and equalizer 274. The output signal of the equalizer 274 is decoded by a data decoder 278 to remove the V.22 bis standard coding from the digital signal.

With further reference to FIG. 9, the applications processor 46 on the PC card of the present invention can be programmed to emulate a standard modem that receives digital data from a digital line. The receiver 264 is modified by programming the applications processor 46 to perform preprocessing operations on the RCVIN signal. The A/D converter 266 and the scale factor 268 is eliminated. The applications processor 46 scales and converts the incoming digital signal from the $\mu$-law or a-Law format to a linear digital format. Further, the applications processor converts the sampling rate of the incoming data from 8000 Hz to 9600 Hz in order for the RCVIN signal to be decoded by the passband filter 270, multiplier 272, equalizer 274 and decoder 278.

The applications processor 46, in this implementation, does not have direct access to the data from either the PC or the telephone line. This is overcome by using the DMA/Interrupt/Refresh controller 64 and the protocol processor 46 to transfer the data between these devices and the shared memory 40, where the applications processor may then access it. Data transmitted to and from the IDSN telephone line is passed through the U interface controller 96, over the IOM-2 bus 86, then through a B channel serial communications controller 48. The DMA controller 64 transfers one byte for each direction every 125 microseconds between the B channel serial controller 48 and the shared memory 40. This is accomplished by the serial communications controller requesting a DMA operation based on a byte being received or sent at the rate determined by the IOM-2 bus which has been phase locked to the CO running at 8000 bytes per second. After the completion of the DMA operation, the DMA controller 64 interrupts the applications processor 46 as an indication that the receive data is valid, or the transmitted data has been sent. Data which is sent or received from the PC is transferred through the rate adaptation circuit 82 to the shared memory 40 by the protocol processor 44. For each byte received from the PC, an interrupt is generated by the protocol processor to the applications processor when it has been stored in the shared memory. When the applications processor has a byte ready to send to the PC, it places the byte into the shared memory 40 and interrupts the protocol processor. The protocol processor subsequently reads the byte from the shared memory and transfers it to the rate adaption circuit 82, whereby the PC can read it. Direct connection of the applications processor to the terminal adapter 84, and the serial commmunications circuit 48 (or, alternatively, the IOM-2 bus 86), provides an alternate means of accessing the data that does not affect the basic implementation.

The present invention also provides an enhancement to conventional telephone call handling or call management systems that permits each user to customize a PC to operate a variety of complex tasks through the use of a user-selected set of command inputs that are collectively known as "macros" in the computer field. As used herein, call management refers to a screen-oriented, menu driven program that provides a system user with an interface with an office telephone switching system such as a PBX or ISDN.

Figure 10:
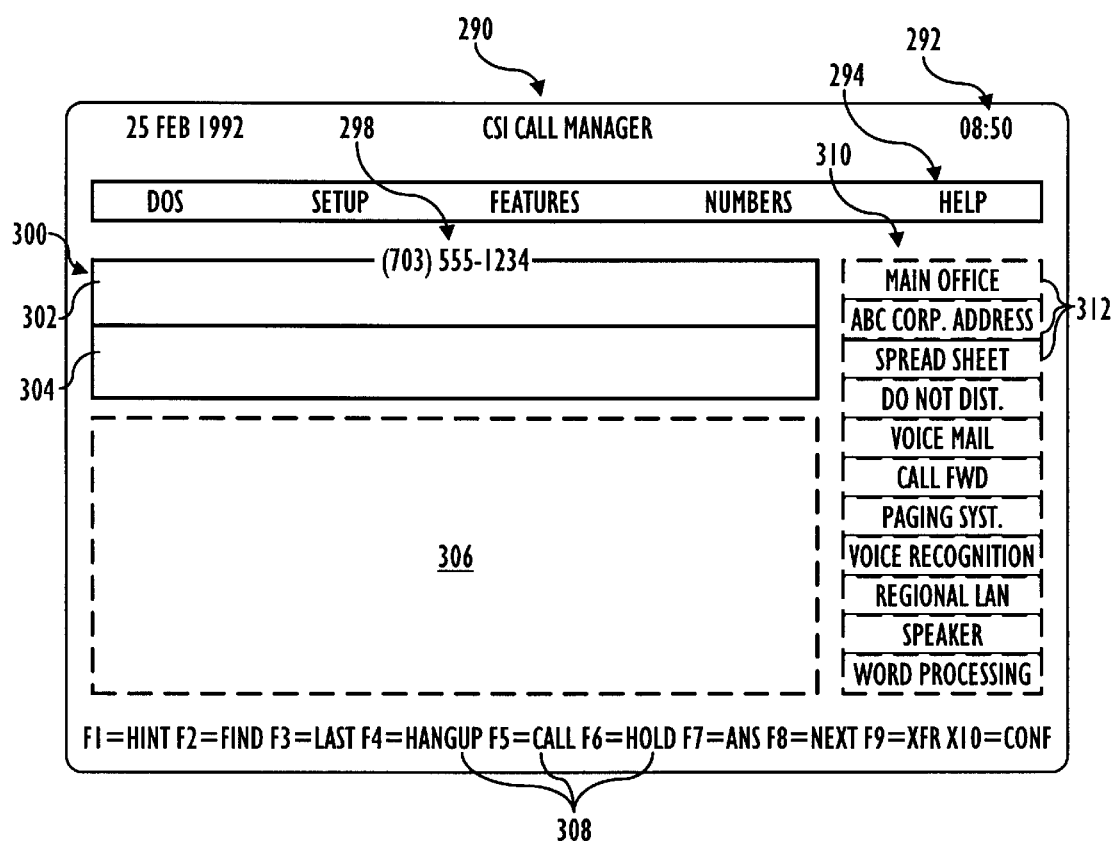
FIG. 10 depicts an illustrative call management screen display used in conduction with a macro command feature for a personal computer in accordance with the present invention.

FIG. 10 depicts an illustrative call management screen display, designated generally by reference character 290, that has been modified to include the macro command feature of the present invention. As is shown in the drawing, the screen display is divided into a number of discrete regions. The title line 292 at the uppermost portion of the screen typically includes general time and date data. The shaded area underlying the title line 292 constitutes a menu bar 294 listing a number of different program options, such as "setup" (for configuring various aspects of the applicable call management features), "features" (for indicating to the user the variety of available call management features), "numbers" (for accessing a personalized telephone directory), and "help" (for problem solving). Additional or different program options can be substituted for those depicted in the drawing in accordance with the design criteria for the call management protocol in use.

The telephone number for each telephone in the ISDN can be displayed along the upper end 298 of a call window 300 that is divided into upper and lower boxes 302 and 304, respectively. The upper or "active" box 302 displays information such as the telephone number of a dialed outgoing call or that of an incoming call in instances where caller origination software is in use in the ISDN (for intra-network calls) or municipal telephone system (for "foreign" calls) such as the local Bell operating company in the United States. The lower or "inactive" box displays information about other call appearances such as data calls, calls placed on "hold", unanswered incoming calls, incoming calls via transfer, and the like. A data display window 306 underlies the call window 300 and is used to dynamically display relatively large scale information such as network or personal telephone directories, call logs, "help" text, and the like. A line 308 of function key legends underlies the data display window 306 and provides the identity of the role of computer keyboard function keys. In the preferred aspect of the invention, the call management system is configured to recognize ten keyboard function keys, the number of function keys provided in the first generation of IBM-PC machines and PC-compatibles. However, legends for a greater or lesser number of keyboard function keys can be provided in accordance with the type of keyboard in use with the user PC.

A user macro window or work area, designated generally by reference character 310, is provided along the right-hand portion of the screen display 290. The macro window is divided into ten equal sized boxes 312 for displaying to the user macro recognition characters such as combinations of letters and/or numbers that the user has selected to identify a given macro. However, a greater or lesser number of macro windows can be provided in accordance with such factors as screen size, capabilities of the PC and the PC screen on which the call management system is running, and user preference. Examples of the types of functions that can be incorporated into a macro in accordance with the teachings of the present invention include, by way of example, the provision of "one touch" or "speed dialing" telephone numbers, directory search and dial functions, call blocking, call routing to a voice mailbox or a message center, accessing of a voice recognition system for running higher level functions, accessing of related software programs such as word processing and spreadsheet programs, and the like. Any of the foregoing macro commands or other displayed command options can be selected by appropriate command signal input, such as that which can be implemented through a computer keyboard, mouse, light pen, or other input device. Details concerning the set-up and utilization of macros will be described in greater detail below.

The user configurable macros of the present invention are particularly advantageous when used in conjunction with the PC ISDN interface described previously in connection with FIGS. 2–5. The interface is configured to be received within an available 8 or 16-bit ISA/EISA bus on the PC motherboard in the manner described above. However, the user configurable macros can be used with other telephone and telephone/PC systems that provide what are commonly known as "call management" functions, including those which operate in a non-ISDN environment.

Figure 11:
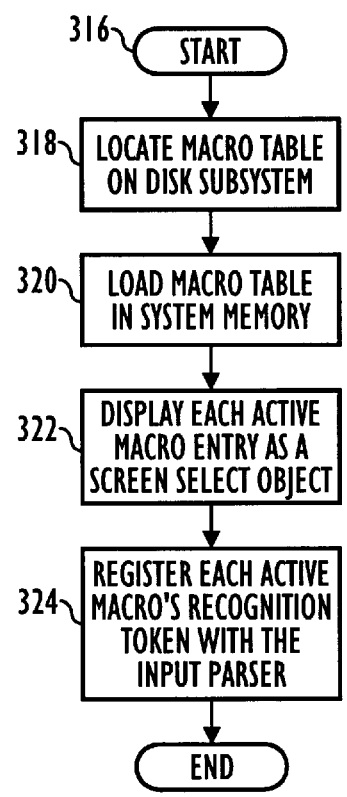
FIG. 11 is a flow chart depicting the sequence of operations for initializing user configurable macros in accordance with the present invention.

The software which initiates and runs the user configurable macros of the present invention is preferably incorporated into the existing call management program's master initialization section in a manner that is well known in the art. Preferably, such a call management system is configured to operate on the PC's host processor and the PC's RAM memory in a "terminate and stay resident" (TSR) mode. Initialization of the user configurable macros is described in the flow chart of FIG. 11. Initialization can be started (block 316) upon user accessing of the call management program, as can typically be accomplished by selecting the program from a menu of options displayed at start-up of the PC, or by incorporating the call management program into the booting process, as can be accomplished by rewriting the AUTOEXEC.BAT file so that the PC boots up with the call management software running on the PC.

User macro initialization begins with locating of the existing macro table on the existing memory subsystem, as indicated by block 318. The macro table includes a listing of macro functions that have been pre-programmed for use by all users in the ISDN or created by the individual system user. The referenced memory subsystem can include such data storage devices as system hard disks, floppy disks, tapes, RAM disks, and network disks. The macro table is loaded into PC RAM memory, as indicated by block 320, and each "active" or existing macro entry is displayed on the PC screen as a screen selection option (block 322). The macro image that is displayed on the screen is in the form of a listing of alphanumeric characters of predetermined length, typically up to about 16 in length, which uniquely identifies each given macro. The recognition token for each active macro is registered with the input parser (block 324) in order to allow for recognition of user input, typically in the form of commands entered through the PC keyboard, mouse, light pen, or other suitable input device, and for running of an active macro upon receipt of the appropriate form of input from the PC user.

Figure 12:
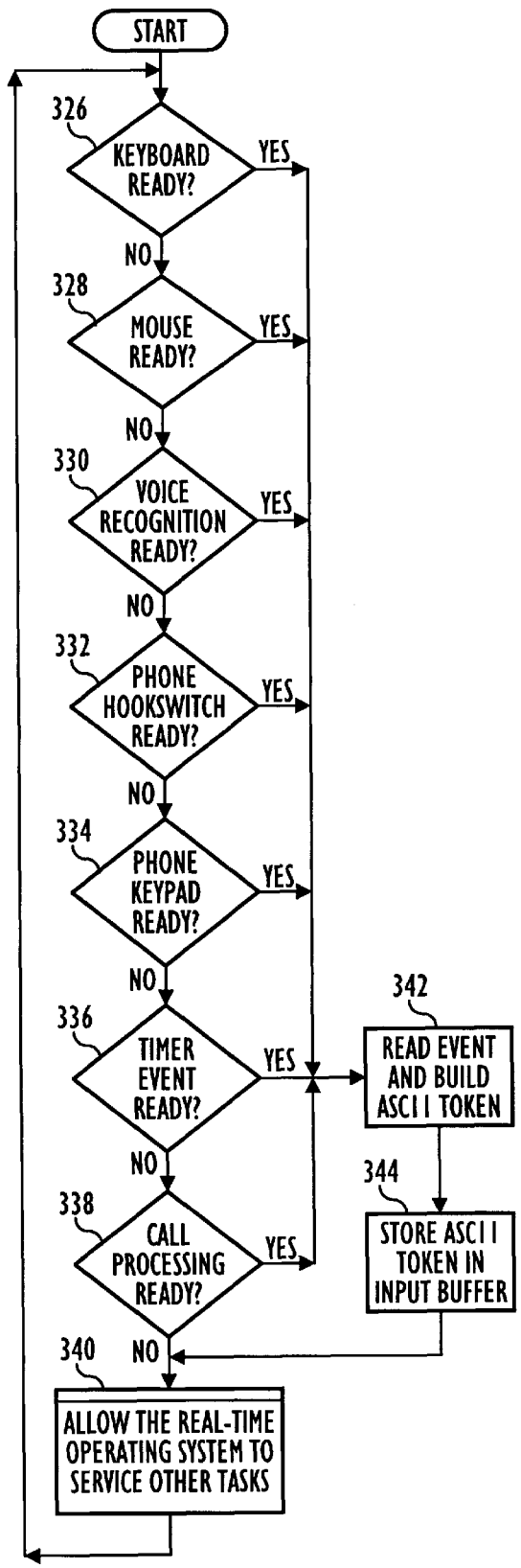
FIG. 12 is a flow chart depicting the sequence of operations for monitoring user inputs for macro triggering inputs.

FIG. 12 illustrates the call management program event input task that monitors the system for various forms of user input that can be implemented to "trigger" (i.e., initiate) a macro. The event input task is stored in PC RAM memory and recalled upon initiation of the call management protocol for running on the protocol processor 44. Upon starting of the call management program, a continuous polling is initiated of the operational status of various components and systems associated with ISDN call handling, as indicated by decision blocks 326, 328, 330, 332, 334, 336, and 338. As is indicated by the blocks, operation status evaluation is undertaken in a serial manner, beginning with PC keyboard readiness and, in the event of a negative outcome of this status check, mouse readiness and the remainder of the items listed in the diagram (voice recognition, telephone hookswitch, telephone keypad, timer event readiness, and call processing readiness). The availability of each of the foregoing items is evaluated, for example, by determining whether such components (keyboard, mouse, and the like) are plugged in properly and otherwise available to receive command inputs from a user. Sequential polling is undertaken to allow for macro initiation in the absence or malfunction of one or more of the items identified in the flow chart. In the event that none of the foregoing items is ready for use, the call macro system allows for the handling of other tasks, such as word processing, data analysis, and the like, as indicated by block 340.

A favorable outcome from any of the foregoing operational status inquiries allows for reading of the user input, as indicated by block 342, so as to construct an ASCII token that corresponds to the input. The ASCII token is stored in an input buffer located in appropriate memory (block 344) for subsequent recall and use in the manner described below with reference to FIGS. 13 and 14. In either case, the input event is detected and an ASCII token is constructed in the call management software's PC RAM. Once the ASCII token has been created and stored in the foregoing manner, the routine returns to allowing for the handling of other service tasks (block 340).

Figure 13:
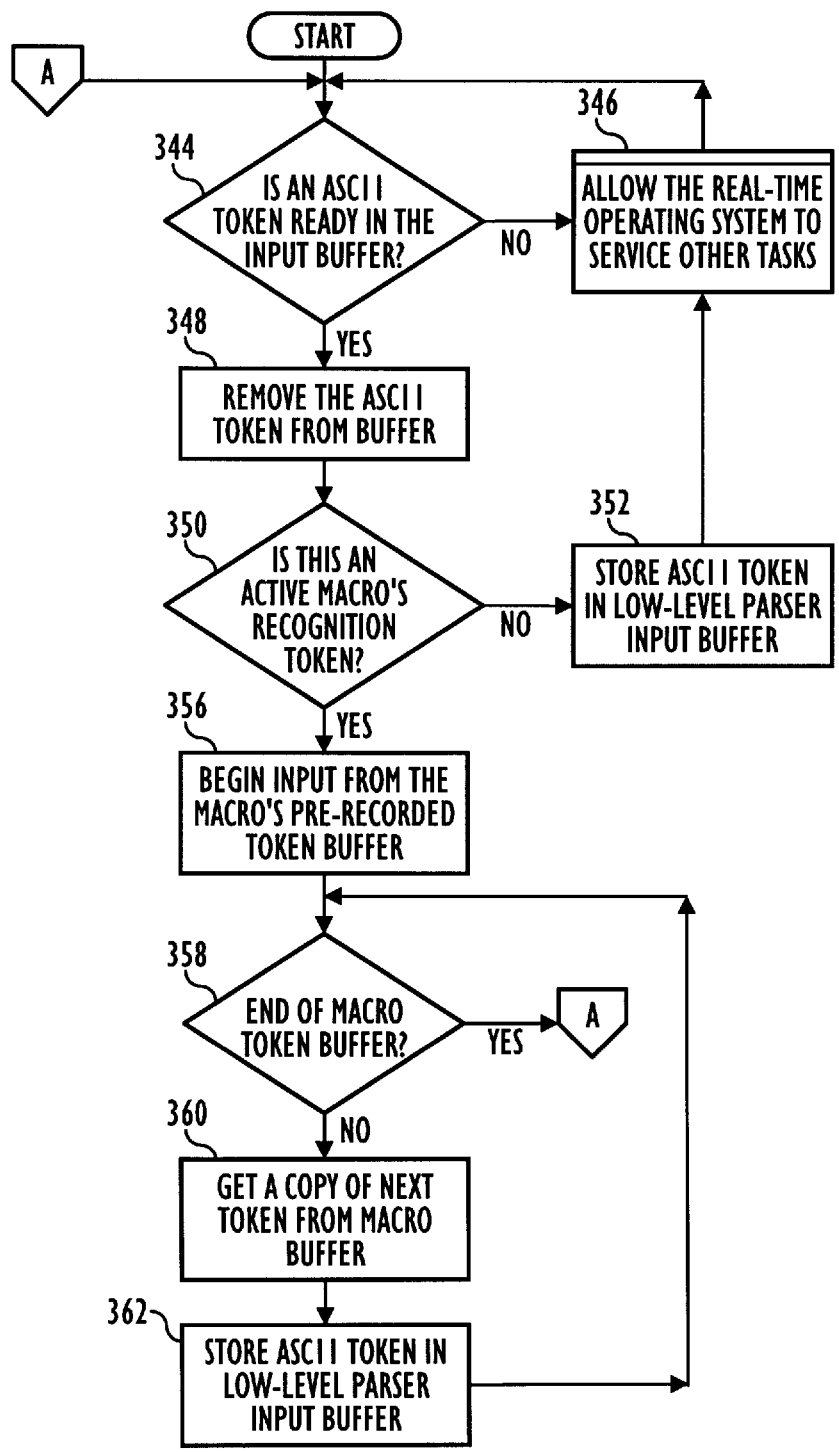
FIG. 13 is a flow chart depicting the sequence of operations for matching a stored ASCII token with a registered, active macro recognition token.
Figure 14:
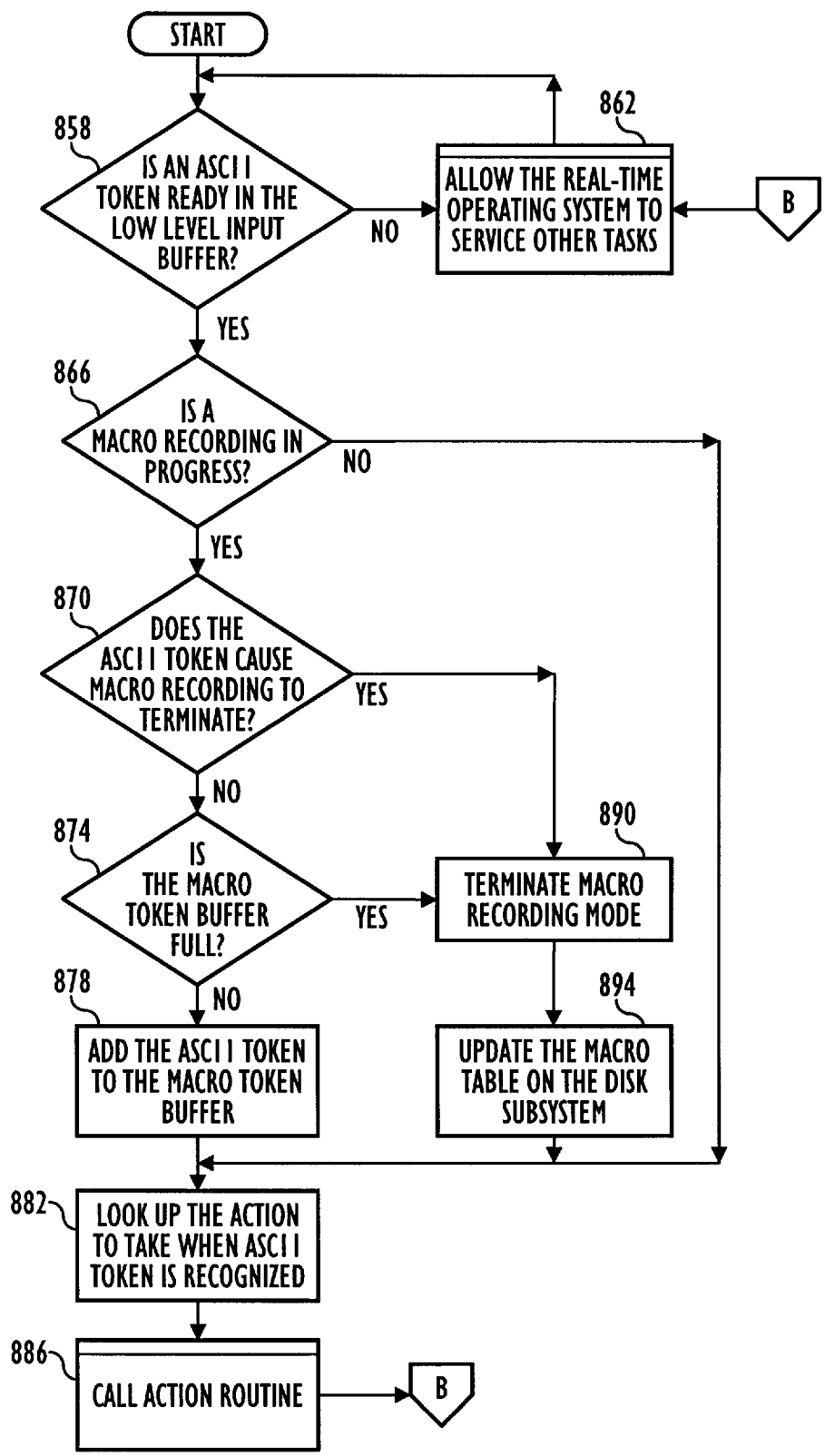
FIG. 14 is a flow chart depicting the sequence of operations for replacing a matched recognition token with the contents of a macro for recording and playback of a user selected macro.

FIGS. 13 and 14 illustrate in detail the processing that is implemented following the creation and storage of an ASCII token. In particular, FIG. 13 illustrates the process of matching a stored ASCII token with a registered, active macro recognition token. FIG. 14 illustrates the process of replacing a matched macro recognition token with the contents of the macro. Both of the ASCII token processing protocols are run by the PC host processor.

With reference to FIG. 13, a high level parser task is started following initiation of the call management program. At the outset of this task, the input buffer located in the PC RAM is checked for the presence of an ASCII token (block 344). In instances where an ASCII token is not present, the high level parser task allows for the servicing of other tasks, as indicated by block 346. However, when the presence of an ASCII token is identified in the input buffer, it is removed from the buffer (block 348) for further processing. The identified ASCII token is compared with a table of active macro recognition tokens (block 350) stored in shared memory (as described above in connection with FIG. 11) to determine whether or not there exists a match. Alternatively, the ASCII token can be interrogated in accordance with a prescribed procedure. In instances where the ASCII token is found not to correspond to a macro recognition token, it is stored in a low level parser input buffer (block 352) to allow for type-ahead equivalent for all input sources, and the parser task returns to allowing for service of other operating tasks (block 346).

In instances where the ASCII token is matched to a macro recognition token (block 350), the contents of the macro pre-recorded token buffer of PC RAM are delivered to the PC system processor (block 356) for processing in the manner to be described below. Upon completion of macro token delivery (block 358), the input parser task returns to the point (block 344) at which the input buffer is evaluated for the presence of an ASCII token. Each ASCII token is fetched from the macro pre-recorded token buffer (block 360) and stored in the PC RAM low level parser input buffer (block 362) until the macro token buffer is emptied (block 358), at which point the input parser task returns to the step of ASCII token input buffer evaluation (block 344).

FIG. 14 depicts the manner in which a low level input parser identified in accordance with the high level parser task described above is processed to allow recording or playback of a user selected macro. As has been mentioned above, this input parser operates continuously upon initiation of the call management program. Upon starting of the low level input parser, the low level input buffer located in PC RAM is evaluated (block 858) for the presence of an ASCII token. In the absence of an ASCII token, the input parser allows for the servicing of other tasks, as indicated by block 862. Identification of the presence of an ASCII token buffer in the low level input buffer initiates a determination (block 866) as to whether a macro is in the process of being recorded. In instances where the outcome of this evaluation is in the affirmative, an evaluation (block 870) is initiated to determine whether the identified ASCII token is of a type which terminates macro recording. In instances where the ASCII token is not identified as a macro recordation terminator, the macro token buffer of the system RAM working memory is interrogated (block 874) for available space. Upon determination of the availability of space in the macro token buffer, the ASCII token is added to the macro token buffer (block 878) and the system RAM (working memory) is interrogated, as indicated by block 882, for the appropriate action to be implemented. Examples of such appropriate action include, by way of non-limiting example, implementing the dialing of one touch or "speed dial" telephone numbers, entry of various programs (word processing, spread sheet, and the like), call forwarding to a specified location, and so forth. Determination of the appropriate action can involve a table search, a series of interrogations that identify the action on the basis of a process of elimination, or any other appropriate identification procedure. In accordance with the nature of the action called for in the interrogation of system RAM (block 882), an appropriate action routine is called (block 886) to implement the macro. Upon completion of the action called for in the macro, the task resumes to the point (block 862) which allows for the running of other system tasks.

With reference once again to the macro recordation evaluation (block 866), failure to detect macro recordation termination macro advances the task to the point at which system RAM is interrogated (block 882) to obtain the action called for by the ASCII token. In instances where the recognized ASCII token represents a command to terminate macro recording (block 870), macro recordation is terminated (block 890), the macro table stored on the disk subsystem is updated (block 894) to include the newly-created macro, and the action to be performed by the macro is determined in accordance with the content of the ASCII token, as noted by block 882 At this point, a visible representation of the macro on the PC screen to the system user is available for playback. It is to be noted that macros created in the foregoing manner can be recorded into other macros. Further, macros may also be created in the manner described above that may not always be displayed on the PC screen.

Combined B-Channel Data Transfer

As has been noted previously, a basic rate interface (BRI) ISDN line includes two 64 kbit B-channels (typically designated $B_1$ and $B_2$) for circuit switched data call transmission, and a 16 kbit D-channel for call set-up communication. Recently developed primary rate interface (PRI) ISDN lines include 23 available B-channels. A limitation in prior art ISDN communication systems is the failure of hardware and software to substantially simultaneously to utilize more than one of the available B-channels for call data transmission. As a result of this limitation, the data communication capabilities of ISDN technology have not been utilized.

Each B-channel circuit switched data call transports its data in the form of discrete packets that are configured in accordance with a suitable protocol such as the LAP-D link access protocol. The access protocol is stored within an LAP-D controller 50 such as the Siemans Model 525 that is positioned on the PC card described above. The LAP-D link protocol organizes discrete packets for sequential transmission along the respective B-channels that are assigned to a channel group at the outset of the call in order that they may be decoded at the receiving end and arranged in accordance with transmission (as opposed to receiving) sequence. Transmission sequence in the foregoing example is maintained through application of a predetermined sequential assignment to the B-channels constituting the channel group of data packets from the LAP-D controller 50 in instances where there exists for the packet a spare element that can be used for this sequence number; otherwise, the packet is reformatted. Alternatively, the LAP-D controller can be operated to assign a sequence tag so that the packets can be decoded and reassembled into their proper order at the receiving end of the packet transmission. As used throughout this disclosure, the term "packet" pertains to a series of bytes that constitute a user-designated unit. Because the units can be of variable length, situations arise at which a previously-transmitted packet of relatively great length is not received in its complete form for decoding until after a later-transmitted, relatively short packet has been received. In such instances, each receiver terminal queues the second (shorter packet) until the first (longer packet) has been received, at which point both packets are passed to the PC application in their correct sequence.

In a manner that will be described in greater detail below, the PC card described above allows not only for the combined use of B-channels in the manner mentioned above, but also for the dynamic conversion of combined B-channel data calls into a single B-channel data call, thus freeing one of the two previously-used B-channels for use in a voice call or unrelated data call. This conversion process requires that the sender and each receiver know of and coordinate the call channel modification. Knowledge concerning the channel conversion modification is accomplished through the sending of a characteristic B-channel control packet that indicates which of the two or more B-channels is to be dropped and when. Transmission along all B-channels is suspended until receipt of confirmation from each caller recipient of a channel control packet confirming channel modification in the manner consistent with the initial control packet. Upon receipt of confirmation, the party initiating B-channel modification switches to the prescribed B-channel(s) and resumes transmission along the modified channel group. A similar process to that described above can be undertaken to convert a single B-channel data call into a combined B-channel data call. Details of B-channel group modification in the foregoing manner are described below in connection with FIGS. 17 and 18.

Figure 15:
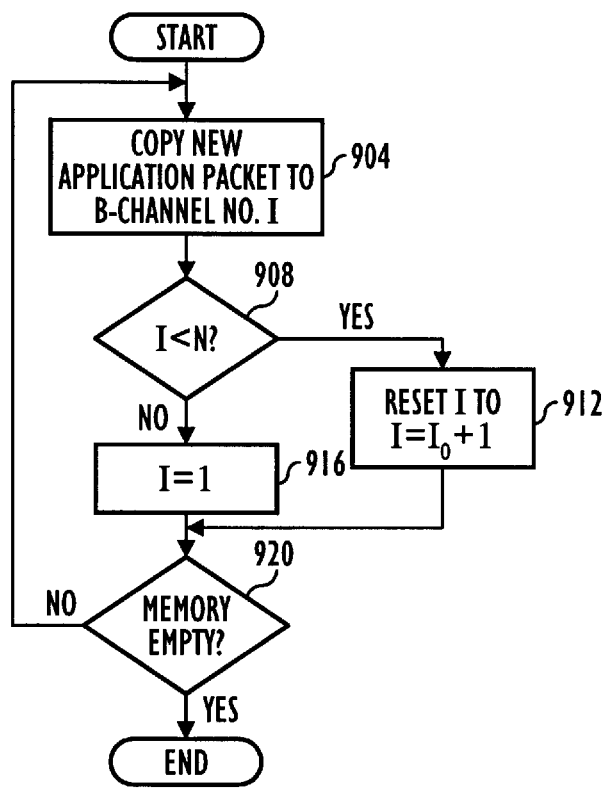
FIG. 15 is a flow chart depicting the sequence of operations for packet sequencing in accordance with the present invention.

With reference to FIG. 15, there are depicted details of packet sequencing for transmission to each of one or more parties to a call. As has been mentioned previously, up to two B-channels are available for basic rate interface (BRI) ISDN calls, whereas up to 23 B-channels are available for primary rate interface (PRI) ISDN calls. The number of B-channels to be used for a given ISDN call is arranged at call initiation through data exchanged along the D-channel with the central office housing the public switch network. The packet sequencing process is initiated at the outset of the call, as can be accomplished, by way of example, by lifting the telephone receiver from its receptable. The software for accomplishing packet sequencing is loaded as part of the accelerator card's initiation sequence and is stored in memory such as the system hard disk for downloading to PC card RAM and processing by the protocol processor 44. Information packets, once formed in the manner described above through application of the LAP-D link access protocol residing in the LAP-D controller 50, are sequentially copied to the appropriate B-channel number in accordance with the number of channels designated for handling of the call, as indicated by block 904. For example, for two channel B-channel BRI calls, the data packets can be allocated solely to a single B-channel or can be allocated to the two B-channels in accordance with a predetermined allocation scheme that is established in the packet sequencing software. In a preferred aspect of the invention, the packets are allocated in alternating fashion to the respective B-channels in instances where the two B-channels are in use. Alternatively, a sequence tag can be assigned to each packet and the packet, once tagged, can be allocated to either of the available B-channels for sending along the ISDN line. In instances where a sequence tag is supplied and then applied to the LAP-D link protocol, the packets at the receiving end are re-sequenced in accordance with the sequence identifier tag and forwarded to the appropriate processor (typically the PC's processor) for handling. In instances where a PRI ISDN line is in use, up to the available 23 B-channels, can be designated for use during the call, in which case the data packets (or portions thereof) are apportioned among the number of available B-channels in accordance with the packet apportioning sequence employed (i.e., alternating channel, packet identifier, or the like). In both instances (BRI and PRI), the number of selected B-channels is noted for processing in the manner described below to insure proper packet sequencing. The value "N" in the flow chart corresponds to the number of selected B-channels for the call. This total number is continuously compared to the channel index number "I" that is assigned to distinguish the selected channels from one another.

Once the data packet or portion thereof has been copied in the foregoing manner and assigned to an appropriate B-channel, the channel index I is compared to the channel number setting N, as shown by block 908. In instances where the index number I is less than the channel setting number N, the setting of the index number I is incrementally advanced, to the next index number, as indicated by block 912. In instances where the set channel number I is not less than the channel number setting N (block 908), the index number I is interpreted as being equal to 1, as indicated by block 916. Following outcome of the foregoing index and channel number comparisons, the PC card RAM is interrogated for the presence of additional packets or packet portions, as indicated by block 920. In instances where the memory includes additional packets or packet portions (i.e., memory not empty), the foregoing packet sequence process referenced above with respect to block 904 is implemented until all packets/packet portions have been sequenced for transmittal along the appropriate B-channels, at which point the packet sequencing process ends.

With reference to FIGS. 16A and 16B, there are disclosed details of the process by which a B-channel can be added to an existing B-channel communication group. FIG. 16A indicates the protocol at the channel-requesting side of the communication link, whereas FIG. 16B illustrates the protocol at the one or more requestee sides of the communication link. In each of these two drawings, a communication link is established and running between two or more user terminals.

The process of B-channel addition to a call group begins upon entry of an appropriate user input command, such as can be accomplished at the outset of the call through selection of a "combined B-channel call" prompt that can be generated incident to running of the the call management protocol, as indicated by block 932. Alternatively, appropriate command input can be input to the system through depressing of an appropriate keyboard key or key sequence, positioning and clicking of a mouse, directional orientation of a light pen, or similar appropriate form of user input to the protocol processor 44. Upon receipt of the appropriate form of input command, a signal is originated from PC card RAM to the data packet sequencer to suspend transmission of the application packets or packet segments, as indicated by block 936. Following suspension of the application packet/packet portion transmission, a packet is formulated in card RAM and delivered to the packet sequencer for transmitting along the appropriate one of the existing B-channels notifying others on the communication link that an additional B-channel is to be added (block 940). As will be described in greater detail below, a reply is generated from each recipient of the "add B-channel" data packet. Upon confirmation of receipt of the "add B-channel" packet from each of the parties to the communication (944), the software resident on PC RAM is operable to add the new B-channel to the existing channel group, as indicated by block 948. Once the new B-channel has been added to the communication channel group, the B-channel number setting (N) and channel index (I) are appropriately reset, as indicated by blocks 952 and 956, respectively, to reflect the addition of the new B-channel. Once these respective indices have been reset to their new values, the flow is resumed by enabling the packet transmission software service (block 960) The B-channel control application's packets are given priority over all other packet exchanges. Thus, the originator waits until the B-channel application sequence completes before resuming normal transmission service.

With reference to FIG. 16B, there is depicted the processing scheme that is followed at PC stations along the communication line that are to respond to the "add B-channel" packet issued in the manner described above. Upon receipt of an "add B-channel" command packet, as indicated by block 964, the protocol processor 44 is operable to direct the packet sequencer to transmit an acknowledgement of the "add B-channel" packet, as indicated by block 966. A new B-channel is added to the existing communications group, as indicated by block 968, and the respective B-channel number setting (N) and index (I) are reset accordingly, as indicated by blocks 970 and 972, in accordance with the addition of the new B-channel to the group. All call processing in the foregoing manner is accomplished through an input from PC RAM, which implements the opening of channel availability to the communications group.

As is indicated in FIGS. 17A and 17B, the manner in which B-channels are deleted from an existing call channel group is analogous to that described above with respect to their addition to the group. With particular reference to FIG. 17A, there is depicted the manner by which a party to a call implements removal of a B-channel from the call group. B-channel deletion is initiated upon input in an appropriate manner (i.e., keyboard key depression, mouse movement and clicking, light pen illumination, and the like), as indicated by block 982, which results in signal output from the PC RAM to the packet sequencer 84, which results in a suspension of packet or packet portion transmission (block 984) along all of the communication channels. Upon suspension of packet transmission in the foregoing manner, a "drop B-channel" packet is dispatched from the packet sequencer (block 986) to all systems along the communication line. Upon dispatch of the "drop B-channel" packet, the host or packet-originating system pauses to await receipt of confirmation from the caller stations that are parties to the call, as indicated by block 988. Packet transmission is suspended by the host PC system until confirmation is received from each communicant. Upon receipt of the appropriate confirmations from the other parties to the call, the B-channel is removed from the communications group, as indicated by block 990, and the respective channel designation number (N) and channel index (I) are reset, as indicated by blocks 992 and 994, after which transmission of data packets by the packet sequencer is re-established (block 996) along the communication line in the manner described above.

The manner in which B-channel deletions are handled by other parties to the call is illustrated in FIG. 18B. Upon receipt of a "drop B-channel" command packet, indicated by block 998, the packet sequencer 84 is operable in accordance with signal input from PC card RAM to transmit a channel deletion command acknowledgement packet, indicated by block 1000. Following transmission of the command acknowledgement, is operable in accordance with input from PC card RAM to delete one of the B-channels from the channel communication group (block 1002). Following B-channel deletion in the foregoing manner, the call protocol running from PC card RAM is operable to re-set the B-channel number setting (N) and index (I), as indicated by blocks 1004 and 1006, respectively, in order that the decrement in B-channels in the group can be registered on PC card RAM to allow for packet sequencing in accordance with the change in number of channels in the group.

Figure 18:
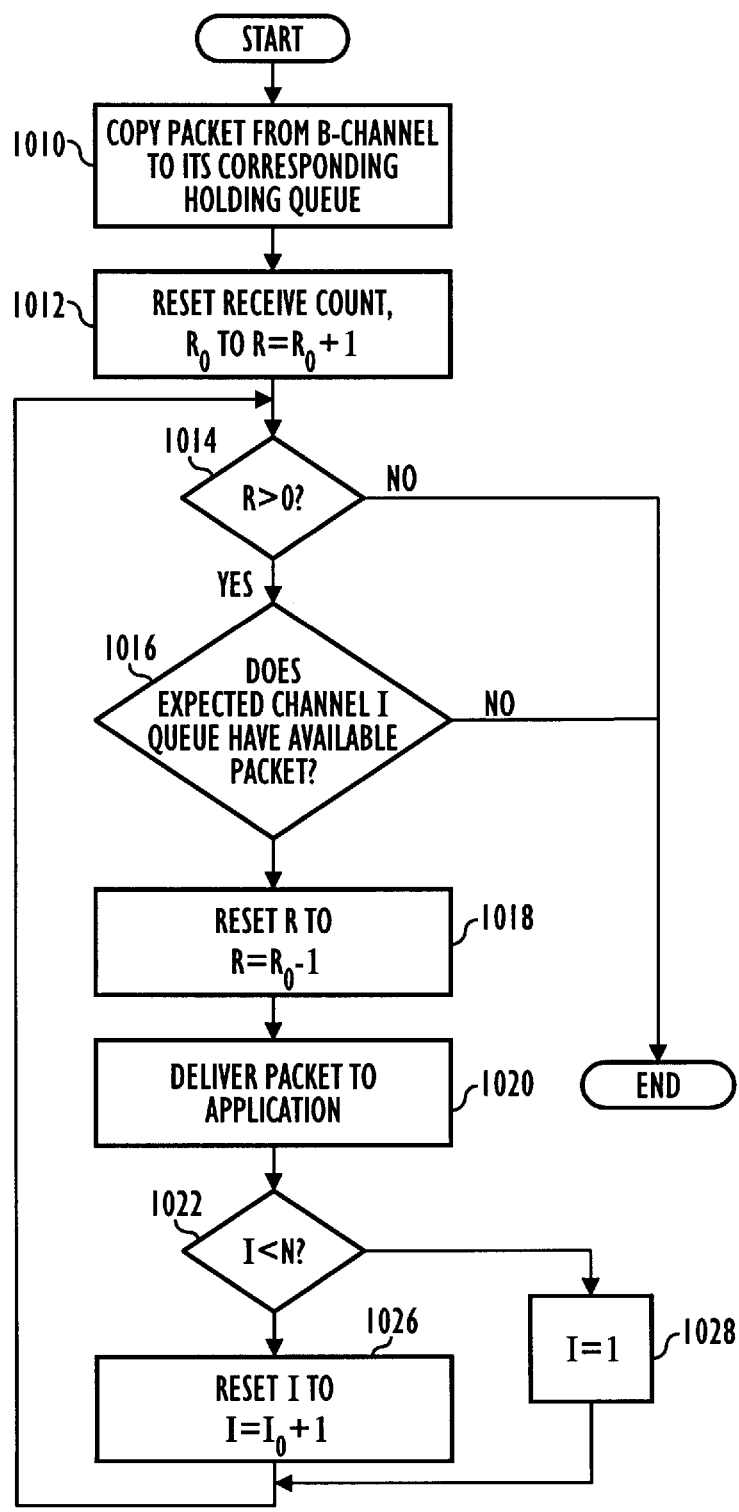
FIG. 18 is a flow chart depicting the sequence of operations for resequencing packets at a receiver station.

Details of the manner in which data packets are resequenced at the receiver stations are indicated in FIG. 18. With reference to this drawing, packets received along the communication channel are copied to the holding queue that is unique to each channel, as indicated by block 1010. The respective channel holding queues are resident in PC card RAM. In general, data packets are re-sequenced in accordance with the B-channel along which the packet is transmitted. Alternatively, data packet sequencing can be accomplished in accordance with a sequence tag that is provided by the packet sequencer 84 at the host or transmitting end of the call.

As the data packets are delivered to PC card RAM at the receiving end of the call, a running total received count R is generated which counts the number of packets and increases the count number R in accordance with each packet received, as indicated by block 1012. In instances where the received count number R is greater than zero (block 1014), the system is operable in accordance with signal output from PC card RAM to evaluate whether or not there exists in the holding queue a data packet that is available for re-sequencing. As has been discussed previously for this embodiment, data packet sequencing is preferably enacted in accordance with the channel along which the packet is transmitted. As data packet length can vary, it is possible that packets transmitted in proper sequence are received from re-sequencing in non-sequential manner due to the differences in transmission times that arise as a result of the foregoing differences in packet length. Therefore, availability of packets in the holding queue for each B-channel can be monitored in accordance with PC RAM input to ensure that the data packets are removed from the respective B-channel holding queues in accordance with the sequence in which they were transmitted along their respective, corresponding channels.

Returning once again to block 1016, in instances where there exists a data packet in the holding queue for the "expected" B-channel, the received count R is decremented (block 1018) and the packet is delivered to the appropriate application (block 1020) for processing by the PC microprocessor in an appropriate manner called for by the application program. As the resequencing process stored in PC card RAM is operable to sequentially poll the B-channels constituting the call channel group, an ongoing comparison is implemented which relates B-channel index I to B-channel designation number N. As is indicated by block 1022, in instances where the index I identifying a given B-channel is a number which is less than the value (N) corresponding to the total number of B-channels constituting the channel group, the channel index I is incrementally advanced from its preceeding value IO, as indicated by block 1026, and processing continues from the point noted with respect to block 1014 relating to evaluation of the received count value R. In instances where the result of the B-channel index and designation number comparison (block 1022) is in the negative, the system recognizes that the B-channel index number is equal to one (block 1028) and processing continues in the manner described above from a point at which the receive count value R is evaluated (block 1014). In instances where the receive count R is not greater than one (block 1014) or the expected B-channel queue does not have a packet stored therein (block 1016) call packet sequencing is determined to be complete and the sequencing protocol is terminated. While a B-channel removed from a group is still present as an ISDN data call, it should be disconnected using D-channel signalling in an appropriate manner, such as by way of call placement to the public switch via the call management software.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory;

wherein said digital signal processor performs said modem function by scaling and converting incoming digital data from u-Law or a-Law format to a linear digital format, whereby said digital signal processor is used to convert digital data in the EMS memory directly to digital data representing the analog signal; and a direct memory access (DMA) interrupt and refresh controller coupled to said protocol processor for controlling the transfer of data to and from said terminal computer and said ISDN interface to said shared memory.

2. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition facsimile and modem functions on said data stored in said shared memory;

a direct memory access (DMA) interrupt and refresh controller coupled to said protocol processor for controlling the transfer of data to and from said terminal computer and said ISDN interface to said shared memory; and wherein said protocol processor, said digital signal processor and said computer interface circuit are each coupled to address and data bus buffers, said ISDN interface further comprising at least one arbitration circuit to selectively enable said address and data buffers.

3. The system for interfacing a terminal computer with an ISDN as claimed in claim 2, wherein said arbitration circuit is implemented using at least one programmable logic device.

4. The system for interfacing a terminal computer with an ISDN as claimed in claim 2, wherein said arbitration circuit provides memory cycles to said DMA interrupt and refresh controller, said protocol processor, said digital signal processor and said terminal computer by enabling corresponding ones of said address and data buffers.

5. The system for interfacing a terminal computer with an ISDN as claimed in claim 2, wherein said DMA interrupt and refresh controller transmits data from said shared memory device to said ISDN and said terminal computer.

6. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor; and a digital signal processor coupled to said shared memory performing at least one of a plurality of operations comprising data compression, data encryption, voice recognition, facsimile and modem functions on said data stored in said shared memory;

wherein said digital signal processor performs said modem function by scaling and converting incoming digital data from u-Law or a-Law format to a linear digital format, whereby said digital signal processor is used to convert digital data in the EMS memory directly to digital data representing the analog signal.

7. An ISDN interfacing system as claimed in claim 6, wherein said protocol processor is programmable to process data received from said terminal computer and said ISDN that is encoded in accordance with a number of different protocols.

8. An ISDN interfacing system as claimed in claim 6, further comprising a rate adaption circuit for allowing a serial communication port coupled to said ISDN interfacing system to transfer data over said ISDN.

9. An ISDN interfacing system as claimed in claim 8, wherein said rate adaption circuit comprises a terminal adapter circuit for generating signals for interfacing with a communication port associated with said terminal computer.

10. An ISDN interfacing system as claimed in claim 9, wherein said rate adapter circuit comprises a universal asynchronous receiver/transmitter coupled to said computer interface for supplying data to said terminal adapter.

11. An ISDN interfacing system as claimed in claim 9, wherein said terminal adapter is configured for coupling with said protocol processor and said shared memory device.

12. An ISDN interfacing system as claimed in claim 11, wherein said terminal adapter circuit is configured for coupling with an ISDN bus.

13. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory; and an expanded memory addressing interface coupled to said shared memory device and said computer interface circuit, said terminal computer being operable to access said shared memory device using expanded memory address.

14. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory; and wherein said protocol processor, said digital signal processor and said terminal computer each comprise programmable input/output (I/O) pins and are operable to use corresponding ones of said I/O pins to interrupt each other.

15. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory; and an arbitration circuit for arbitrating accesses to said shared memory device by said protocol processor, said terminal computer, and said digital signal processor.

16. An ISDN interfacing system as claimed in claim 15, wherein said shared memory device comprises at least one dynamic random access memory device (DRAM).

17. An ISDN interfacing system as claimed in claim 16, further comprising a memory control circuit for decoding addresses asserted by said protocol processor, said digital signal processor, and a host processor associated with said terminal computer and generating DRAM address strobes, and providing control signals indicating memory cycle timing to said arbitration circuit.

18. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression data encryption, voice recognition, facsimile and modem functions on said data stored in said shared memory; and a second serial communications circuit configured to employ link access protocols for controlling link access procedures associated with said ISDN.

19. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory; and an ISDN U interface detachably mountable on a card comprising said shared memory device, said computer interface circuit, said protocol processor, said serial communications circuit, said ISDN interface, and said digital signal processor, said ISDN U interface comprising line protection circuitry and a U interface control circuit to provide a direct connection between said card and a two-binary, one-quaternary (2B1Q) U interface line from a central office couple to said ISDN interface, said U interface control circuit being operable to receive data from said card over said ISDN bus, to encode and transmit said card data to said central office, and to decode data received from said central office and supply said central office data to said ISDN bus.

20. An ISDN interfacing system as claimed in claim 19, wherein said U interface control circuit is operable to multiplex data into frames comprising two B channels and one D channel and a number of overhead bits for sending commands, status data and error checking bits.

21. An ISDN interfacing system as claimed in claim 19, further comprising an ISDN S/T interface circuit detachably mountable to said card.

22. A system for interfacing a terminal computer with an integrated services digital network (ISDN) comprising:

a shared memory device;

a computer interface circuit for coupling said terminal computer to said shared memory device;

a protocol processor coupled to said shared memory device;

a serial communications circuit coupled to said protocol processor;

an ISDN interface for transferring data from said serial communications circuit to said shared memory under control of said protocol processor;

a digital signal processor coupled to said shared memory performing at least one of a plurality of operations comprising data compression, data encryption, voice recognition, facsimile and modem functions on said data stored in said shared memory;

wherein said digital signal processor performs said modem function by scaling and converting incoming digital data from u-Law or a-Law format to a linear digital format, whereby said digital signal processor is used to convert digital data in the EMS memory directly to digital data representing the analog signal;

wherein said protocol processor, said digital signal processor, and said computer interface circuit are each coupled to address and data bus buffers;

a direct memory access (DMA) interrupt and refresh controller coupled to said protocol processor for controlling the transfer of data to and from said terminal computer and said ISDN interface to said shared memory;

an arbitration circuit for arbitrating accesses to said shared memory device by said protocol processor, said terminal computer, and said digital signal processor and to selectively address said address and data buffers;

a rate adaption circuit for allowing a serial communication port coupled to said ISDN interfacing system to transfer data over said ISDN; and an ISDN U interface detachably mountable on a card comprising said shared memory device, said computer interface circuit, said protocol processor, said serial communications circuit, said ISDN interface, and said digital signal processor, said ISDN U interface comprising line protection circuitry and a U interface control circuit to provide a direct connection between said card and a two-binary, one-quaternary (2B1Q) U interface line from a central office couple to said ISDN interface, said U interface control circuit being operable to receive data from said card over said ISDN bus, to encode and transmit said card data to said central office, and to decode data received from said central office and supply said central office data to said ISDN bus.

* * * * *